US012802170B2

(12) United States Patent
Ravi Kumar et al.

(10) Patent No.: US 12,802,170 B2
(45) Date of Patent: Nov. 17, 2026

(54) STOCHASTIC DYNAMIC FIELD OF VIEW FOR MULTI-CAMERA BIRD'S EYE VIEW PERCEPTION IN AUTONOMOUS DRIVING

(71) Applicant: QUALCOMM Incorporated, San Diego, CA (US)

(72) Inventors: Varun Ravi Kumar, San Diego, CA (US); Kiran Bangalore Ravi, Paris (FR); Senthil Kumar Yogamani, Headford (IE)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 18/505,923

(22) Filed: Nov. 9, 2023

(65) Prior Publication Data

US 2025/0156997 A1 May 15, 2025

(51) Int. Cl.

| | |
|---|---|
| ***G06T 3/4038*** | (2024.01) |
| ***G06N 3/047*** | (2023.01) |
| ***G06T 5/50*** | (2006.01) |
| ***G06T 7/70*** | (2017.01) |
| ***G06V 10/40*** | (2022.01) |
| ***G06V 20/56*** | (2022.01) |

(52) U.S. Cl.

CPC ............... *G06T 5/50* (2013.01); *G06N 3/047* (2023.01); *G06T 3/4038* (2013.01); *G06T 7/70* (2017.01); *G06V 10/40* (2022.01); *G06V 20/56* (2022.01); *G06T 2207/20221* (2013.01)

(58) Field of Classification Search

CPC ............ G06T 5/50; G06T 2207/20221; G06T 11/60; G06T 3/4038; G06T 2207/20212; H04N 23/698; H04N 23/45; G06N 3/047

See application file for complete search history.

(56) References Cited

U.S. PATENT DOCUMENTS

| | | | | |
|---|---|---|---|---|
| 2019/0028688 | A1* | 1/2019 | Kumar | H04N 13/246 |
| 2020/0160559 | A1* | 5/2020 | Urtasun | G06N 3/084 |

OTHER PUBLICATIONS

Gao Huang, "Deep Networks with Stochastic Depth", Jul. 2016 (Year: 2016).*

Jose Esparza, "Towards Surround Stereo Vision: Analysis of a New Surround View Camera Configuration for Driving Assistance Applications", Oct. 2014 (Year: 2014).*

(Continued)

*Primary Examiner* — Atiba O Fitzpatrick
*Assistant Examiner* — Caleb L Esquino
(74) *Attorney, Agent, or Firm* — Shumaker & Sieffert, P. A.

(57) ABSTRACT

An apparatus for processing image data includes a memory for storing the image data, wherein the image data comprises a first set of image data collected by a first camera comprising a first field of view (FOV) and a second set of image data collected by a second camera comprising a second FOV; and processing circuitry in communication with the memory. The processing circuitry is configured to: apply an encoder to extract, from the first set of image data, a first set of perspective view features; apply the encoder to extract, from the second set of image data, a second set of perspective view features; and project the first set of perspective view features and the second set of perspective view features onto a grid to generate a set of bird's eye view (BEV) features.

29 Claims, 5 Drawing Sheets

(56) References Cited

OTHER PUBLICATIONS

Guilherme Korol, "Leveraging Stochastic Depth Training for Adaptive Inference", May 2025 (Year: 2025).*
Duishen Chen, "Deep Networks with Stochastic Depth for Acoustic Modelling", Dec. 2016 (Year: 2016).*
Yujie Zeng, "Acceleration of Large Transformer Model Training by Sensitivity-Based Layer Dropping", Jun. 2023 (Year: 2023).*
Xin Wang, "SkipNet: Learning Dynamic Routing in Convolutional Networks", 2018 (Year: 2018).*
Wenhan Xia, "Fully Dynamic Inference with Deep Neural Networks", Jul. 2020 (Year: 2020).*
Minjia Zhang, "Accelerating Training of Transformer-Based Language Models with Progressive Layer Dropping", 2020 (Year: 2020).*
Andreas Veit, "Convolutional Networks with Adaptive Inference Graphs", 2018 (Year: 2018).*

* cited by examiner

STOCHASTIC DYNAMIC FIELD OF VIEW FOR MULTI-CAMERA BIRD'S EYE VIEW PERCEPTION IN AUTONOMOUS DRIVING

TECHNICAL FIELD

This disclosure relates to sensor systems, including sensor systems for advanced driver-assistance systems (ADAS).

BACKGROUND

An autonomous driving vehicle is a vehicle that is configured to sense the environment around the vehicle, such as the existence and location of other objects, and operating without human control. An autonomous driving vehicle may include multiple cameras that produce image data that may be analyzed to determine the existence and location of other objects around the autonomous driving vehicle. In some examples, the output of multiple cameras is fused together to form a single fused image (e.g., a bird's eye view image). Various tasks may then be performed on the fused image, including image segmentation, object detection, depth detection, and the like. A vehicle including an advanced driver-assistance systems (ADAS) may assist a driver in operating the vehicle. The ADAS may use the outputs of the tasks performed on the fused image to make autonomous driving decisions.

SUMMARY

The present disclosure generally relates to techniques and devices for processing image data collected by a multi-camera system in a way that captures information relevant to performing one or more tasks. A multi-camera system may comprise a set of cameras that each include a field of view (FOV) and an optical axis. An FOV is an extent of a scene that is visible through a camera lens. An optical axis may run through a center of a camera lens and extend outward from the center of the camera lens. FOVs of one or more pairs of cameras in the cameras overlap. This means that an object may be within the FOV of more than one camera in the multi-camera system.

An object within the FOV of a camera may appear distorted in a camera image collected by the camera when the object is displaced from the optical axis of the camera and/or when the object is far away from the lens of the camera. When the object is within the FOV of more than one camera, the object may be more distorted in camera images collected by one of the cameras and less distorted in camera images collected by another camera. The multi-camera system may, in some examples, use a dynamic FOV unit to process camera images to identify information that is important for performing one or more tasks. This may involve processing camera images to focus on certain objects rather than focusing on image background. Applying a dynamic FOV unit may allow the multi-camera system to generate information corresponding to relevant objects regardless of whether the object is close to the camera lens, far from the camera lens, displaced from the optical axis, or close to the optical axis.

The multi-camera system may use stochastic depth scaling to train an encoder to extract features from image data. During training, the encoder may randomly skip layers of a residual network, and add the skipped layers back into the residual network after training. The probability of skipping a given layer may depend on the location of one or more objects corresponding to the layer relative to the camera. The probability of skipping a layer corresponding to an important object may be lower than the probability of skipping a layer corresponding to background objects. Once training is complete, the multi-camera system may use a stochastic depth scaling factor to process an incoming camera image to extract bird's eye view (BEV) features based on the spatial location of objects within the camera image.

The techniques of this disclosure may result in improved BEV features generated from image data and/or position data as compared with other systems that do not use an encoder that allows for dynamic FOV configured to adapt to the size and location of objects within a scene. For example, using a dynamic FOV unit to process image data may allow a multi-camera system to extract features that include information corresponding to relevant objects, including objects that are within the FOV of more than one camera. This means that a multi-camera system using a dynamic FOV unit may extract features that are more useful for performing one or more tasks as compared with systems that do not use a dynamic FOV unit to process image data. Examples of tasks that a system may perform using the extracted features include controlling a vehicle, controlling another object such as a robotic arm, and performing one or more tasks involving image segmentation, depth detection, object detection, or any combination thereof.

In one example, an apparatus for processing image data includes: a memory for storing the image data, wherein the image data comprises a first set of image data collected by a first camera comprising a first FOV and a second set of image data collected by a second camera comprising a second FOV; and processing circuitry in communication with the memory. The processing circuitry is configured to: apply an encoder to extract, from the first set of image data based on a location of a first one or more objects within the first FOV, a first set of perspective view features; apply the encoder to extract, from the second set of image data based on a location of a second one or more objects within the second FOV, a second set of perspective view features; and project the first set of perspective view features and the second set of perspective view features onto a grid to generate a set of BEV features that provides information corresponding to the first one or more objects and the second one or more objects.

In another example, a method includes storing image data in a memory, wherein the image data comprises a first set of image data collected by a first camera comprising a first FOV and a second set of image data collected by a second camera comprising a second FOV and applying an encoder to extract, from the first set of image data based on a location of a first one or more objects within the first FOV, a first set of perspective view features. The method also includes applying the encoder to extract, from the second set of image data based on a location of a second one or more objects within the second FOV, a second set of perspective view features and projecting the first set of perspective view features and the second set of perspective view features onto a grid to generate a set of BEV features that provides information corresponding to the first one or more objects and the second one or more objects.

In another example, a computer-readable medium stores instructions that, when applied by processing circuitry, causes the processing circuitry to: store image data in a memory, wherein the image data comprises a first set of image data collected by a first camera comprising a first FOV and a second set of image data collected by a second camera comprising a second FOV; and apply an encoder to extract, from the first set of image data based on a location of a first one or more objects within the first FOV, a first set of perspective view features. The instructions also cause the processing circuitry to apply the encoder to extract, from the second set of image data based on a location of a second one or more objects within the second FOV, a second set of perspective view features; and project the first set of perspective view features and the second set of perspective view features onto a grid to generate a set of BEV features that provides information corresponding to the first one or more objects and the second one or more objects.

The details of one or more examples are set forth in the accompanying drawings and the description below. Other features, objects, and advantages will be apparent from the description, drawings, and claims.

DETAILED DESCRIPTION

Figure 1:
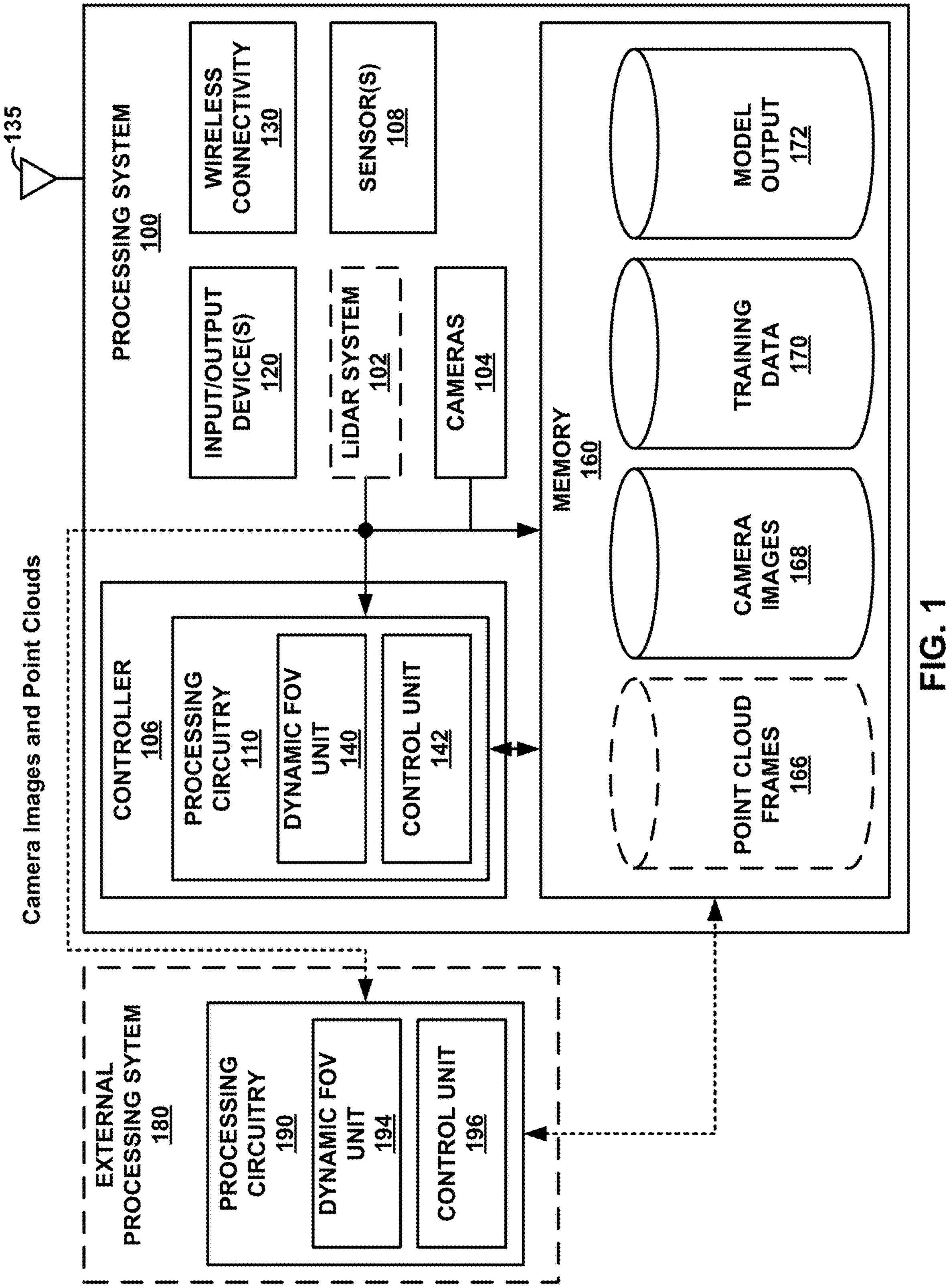
FIG. 1 is a block diagram illustrating an example processing system, in accordance with one to more techniques of this disclosure.

Camera images from a plurality of different cameras may be used together in various different robotic, vehicular, and virtual reality (VR) systems. One such vehicular application is an advanced driver assistance system (ADAS). An ADAS is a system that may perform object detection and/or image segmentation process on camera images to make autonomous driving decisions, improve driving safety, increase comfort, and improve overall vehicle performance. An ADAS may fuse images from a plurality of different cameras into a single view (e.g., a bird's eye view (BEV)) to provide a more comprehensive view of a vehicle's surroundings, enabling the ADAS to better assist the driver in various driving scenarios.

The present disclosure relates to techniques and devices for generating a fused image having fused features from a plurality of different cameras or other sensors. This fused image may be referred to as a "BEV image" or a "set of image data BEV features." The fused image created by the ADAS may represent a set of BEV features comprising a two dimensional (2D) grid of BEV feature cells. For example, the ADAS may extract a set of features from camera images captured by each camera of a set of cameras. Each camera of the set of cameras may have a field of view (FOV), and FOVs of one or more pairs of cameras of the set of cameras may overlap. This means that when the ADAS combines features extracted from camera images collected by different cameras, the system may identify one or more objects that are located in FOV overlap regions. When the ADAS generates the 2D grid of BEV feature cells, features corresponding to objects located in FOV overlap regions may be placed in BEV feature cells based on the location of the object within respective camera views.

It may be beneficial for the ADAS to identify information corresponding to one or more objects and/or characteristics of a three dimensional (3D) environment surrounding the ADAS. An object may appear differently a camera image based on where the object is located in the FOV of the camera capturing the camera image. For example, an object may appear more distorted when the object is far from an optical axis of the camera and appear less distorted when the object is near to the optical axis of the camera. An object may appear smaller when far from the camera and appear larger when close to the camera. In any case, it may be beneficial for the ADAS to identify information corresponding to the one or more objects no matter where the object is located in the FOV of one or more cameras. Additionally, it may be beneficial for the ADAS to identify information corresponding to one or more objects located the FOV of more than one camera.

This disclosure describes techniques for extracting features from camera images collected by a multi-camera system including overlapping FOVs in a way that indicates information corresponding to a 3D environment that is most relevant for performing one or more tasks. These tasks may involve controlling a vehicle, controlling another object such as a robotic arm, performing one or more tasks involving image segmentation, depth detection, object detection, or any combination thereof. For example, An ADAS may include an encoder trained to include stochastic dynamic FOV layers. These stochastic dynamic FOV layers may process input camera images in a way that focuses on relevant objects even when relevant objects are displaced from the optical axis and/or located far from the camera. The dynamic FOV layers may, in some cases, deemphasize regions of a camera image that include background or characteristics that are less relevant for performing one or more tasks. Additionally, or alternatively, the ADAS may project extracted features onto a 2D grid of BEV cells in a way that places information corresponding to relevant objects into respective cells. Even when a relevant object is located within the FOV of more than one camera, the ADAS may process the images in a way that identifies information corresponding to the object and places the information into the corresponding BEV cell.

FIG. 1 is a block diagram illustrating an example processing system 100, in accordance with one to more techniques of this disclosure. Processing system 100 may be used in a vehicle, such as an autonomous driving vehicle or an assisted driving vehicle (e.g., a vehicle having an ADAS or an "ego vehicle"). In such an example, processing system 100 may represent an ADAS. In other examples, processing system 100 may be used in robotic applications, virtual reality (VR) applications, or other kinds of applications that process images from multiple cameras, including multiple cameras having overlapping fields-of-view (FOVs). The techniques of this disclosure are not limited to vehicular applications. The techniques of this disclosure may be applied by any system that processes image data.

Processing system 100 may include Light Detection and Ranging (LiDAR) system 102, cameras 104, controller 106, one or more sensor(s) 108, input/output device(s) 120, wireless connectivity component 130, and memory 160. LiDAR system 102 may include one or more light emitters (e.g., lasers) and one or more light sensors. LiDAR system 102 may, in some cases, be deployed in or about a vehicle. For example, LiDAR system 102 may be mounted on a roof of a vehicle, in bumpers of a vehicle, and/or in other locations of a vehicle. LiDAR system 102 may be configured to emit light pulses and sense the light pulses reflected off of objects in the environment. LiDAR system 102 is not limited to being deployed in or about a vehicle. LiDAR system 102 may be deployed in or about another kind of object. In some examples, processing system 100 may include cameras 104 without including LiDAR system 102. That is, LiDAR system 102 is optional, and processing system 100 may perform one or more techniques of this disclosure without LiDAR system 102 and data collected by LiDAR system 102.

In some examples, the one or more light emitters of LiDAR system 102 may emit such pulses in a 360-degree field around the vehicle so as to detect objects within the 360-degree field by detecting reflected pulses using the one or more light sensors. For example, LiDAR system 102 may detect objects in front of, behind, or beside LiDAR system 102. While described herein as including LiDAR system 102, it should be understood that another distance or depth sensing system may be used in place of LiDAR system 102. The output of LiDAR system 102 are called point clouds or point cloud frames.

A point cloud frame output by LiDAR system 102 is a collection of 3D data points that represent the surface of objects in the environment. LiDAR processing circuitry of LiDAR system 102 may generate one or more point cloud frames mased on the one or more optical signals emitted by the one or more light emitters of LiDAR system 102 and the one or more reflected optical signals sensed by the one or more light sensors of LiDAR system 102. These points are generated by measuring the time it takes for a laser pulse to travel from a light emitter to an object and back to a light detector. Each point in the cloud has at least three attributes: x, y, and z coordinates, which represent its position in a Cartesian coordinate system. Some LiDAR systems also provide additional information for each point, such as intensity, color, and classification.

Intensity (also called reflectance) is a measure of the strength of the returned laser pulse signal for each point. The value of the intensity attribute depends on various factors, such as the reflectivity of the object's surface, distance from the sensor, and the angle of incidence. Intensity values can be used for several purposes, including distinguishing different materials, and enhancing visualization: Intensity values can be used to generate a grayscale image of the point cloud, helping to highlight the structure and features in the data.

Color information in a point cloud is usually obtained from other sources, such as digital cameras mounted on the same platform as the LiDAR sensor, and then combined with the LiDAR data. Cameras used to capture color information for point cloud data may, in some examples, be separate from cameras 104. The color attribute includes color values (e.g., red, green, and blue (RGB)) values for each point. The color values may be used to improve visualization and aid in enhanced classification (e.g., the color information can aid in the classification of objects and features in the scene, such as vegetation, buildings, and roads.)

Classification is the process of assigning each point in the point cloud to a category or class based on its characteristics or its relation to other points. The classification attribute may be an integer value that represents the class of each point, such as ground, vegetation, building, water, etc. Classification can be performed using various algorithms, often relying on machine learning techniques or rule-based approaches.

Cameras 104 may include any type of camera configured to capture video or image data in the environment around processing system 100 (e.g., around a vehicle). In some examples, processing system 100 may include multiple cameras 104. For example, cameras 104 may include a front facing camera (e.g., a front bumper camera, a front windshield camera, and/or a dashcam), a back facing camera (e.g., a backup camera), side facing cameras (e.g., cameras mounted in sideview mirrors). Cameras 104 may be a color camera or a grayscale camera. In some examples, cameras 104 may be a camera system including more than one camera sensor. While techniques of this disclosure will be described with reference to a 2D photographic camera, the techniques of this disclosure may be applied to the outputs of other sensors including a sonar sensor, a radar sensor, an infrared camera, and/or a time-of-flight (ToF) camera.

Each camera of cameras 104 may capture an image with an FOV. The FOV of a camera may represent the extent of the observable world that can be seen through a lens of the camera and captured in an image or video. FOV may be described in terms of an angular extent of a scene, either horizontally, vertically, or diagonally, that a camera is configured to capture. The FOV of a camera may determine which objects of a scene are included in a camera image captured by the camera and how much of the scene is visible in the camera images. In some examples, an FOV is expressed in degrees and is referred to as an angle of view. A wider angle of view captures more of a scene, while a narrower angle of view focuses on a smaller portion of the scene. The focal length of a camera lens plays a significant role in determining FOV. A shorter focal length results in a wider angle of view, while a longer focal length narrows the angle of view.

In some examples, zoom lenses have the ability to change a focal length of a camera, which means that zoom lenses can adjust a field of view. Zooming in provides a narrower FOV, while zooming out offers a wider FOV. The size of an image sensor of a camera may affect affects the FOV of a camera. Cameras with smaller sensors have a narrower field of view compared to cameras with larger sensors. The FOV also impacts the perspective and composition of an image. A wider field of view can make objects appear smaller and create a sense of depth, while a narrower field of view can emphasize specific elements in the scene.

In some examples, cameras 104 may include a set of cameras that are positioned to capture an environment surrounding an object, such as a vehicle. The FOVs of cameras 104 may overlap so that cameras 104 capture relevant objects within the environment surrounding the object. That is, cameras 104 may be positioned to avoid "gaps" where objects are not captured by cameras 104. When the FOVs of cameras 104 overlap, an object may be captured by more than one of cameras 104 when the object is located in an overlap between the FOVs of more than one camera.

Processing system 100 may include cameras 104 without including LiDAR system 102. For example, processing system 100 may perform one or more tasks including controlling a vehicle, controlling another object such as a robotic arm, and performing one or more tasks involving image segmentation, depth detection, object detection, or any combination thereof based on data collected by cameras 104 without relying on data collected by LiDAR system 102. In some examples, processing system 100 may supplement data collected by cameras 104 with data collected by LiDAR system 102. Using data collected by cameras 104 and data collected by LiDAR system 102, processing system 100 may perform the one or more tasks.

In some cases, it may be beneficial to combine data collected by LiDAR system with data collected by cameras 104 because position data may include some information not indicated by image data and image data may include some information not indicated by position data. For example, LiDAR system 102 may be configured to collect point cloud frames 166. Cameras 104 may be configured to collect camera images 168. Data input modalities such as point cloud frames 166 and camera images 168 may each indicate one or more characteristics of objects in a 3D environment. For example, object position and object shape may be prevalent in point cloud frames 166 and color and texture data may be prevalent in camera images 168. This means that processing both point cloud frames 166 and camera images 168 might in some cases result in features that provide more information concerning a 3D environment. Processing both point cloud frames 166 and camera images 168 is not required. In some examples, processing system 100 may process camera images 168 without processing point cloud frames 166. In some examples, the plurality of point cloud frames 166 may be referred to herein as "position data." In some examples, the plurality of camera images 168 may be referred to herein as "image data."

Wireless connectivity component 130 may include subcomponents, for example, for third generation (3G) connectivity, fourth generation (4G) connectivity (e.g., 4G Long Term Evolution (LTE)), fifth generation (5G) connectivity (e.g., 5G or New Radio (NR)), Wi-Fi connectivity, Bluetooth connectivity, and other wireless data transmission standards. Wireless connectivity component 130 is further connected to one or more antennas 135.

Processing system 100 may also include one or more input/output devices 120, such as screens, touch-sensitive surfaces (including touch-sensitive displays), physical buttons, speakers, microphones, and the like. Input/output device(s) 120 (e.g., which may include an I/O controller) may manage input and output signals for processing system 100. In some cases, input/output device(s) 120 may represent a physical connection or port to an external peripheral. In some cases, input/output device(s) 120 may utilize an operating system. In other cases, input/output device(s) 120 may represent or interact with a modem, a keyboard, a mouse, a touchscreen, or a similar device. In some cases, input/output device(s) 120 may be implemented as part of a processor (e.g., a processor of processing circuitry 110). In some cases, a user may interact with a device via input/output device(s) 120 or via hardware components controlled by input/output device(s) 120.

Controller 106 may be an autonomous or assisted driving controller (e.g., an ADAS) configured to control operation of processing system 100 (e.g., including the operation of a vehicle). For example, controller 106 may control acceleration, braking, and/or navigation of vehicle through the environment surrounding vehicle. Controller 106 may include one or more processors, e.g., processing circuitry 110. Controller 106 is not limited to controlling vehicles. Controller 106 may additionally or alternatively control any kind of controllable device, such as a robotic component. Processing circuitry 110 may include one or more central processing units (CPUs), such as single-core or multi-core CPUs, graphics processing units (GPUs), digital signal processor (DSPs), application specific integrated circuits (ASICs), field programmable gate arrays (FPGAs), neural processing unit (NPUs), multimedia processing units, and/or the like. Instructions applied by processing circuitry 110 may be loaded, for example, from memory 160 and may cause processing circuitry 110 to perform the operations attributed to processor(s) in this disclosure.

An NPU is generally a specialized circuit configured for implementing control and arithmetic logic for executing machine learning algorithms, such as algorithms for processing artificial neural networks (ANNs), deep neural networks (DNNs), random forests (RFs), kernel methods, and the like. An NPU may sometimes alternatively be referred to as a neural signal processor (NSP), a tensor processing unit (TPU), a neural network processor (NNP), an intelligence processing unit (IPU), or a vision processing unit (VPU).

Processing circuitry 110 may also include one or more sensor processing units associated with LiDAR system 102, cameras 104, and/or sensor(s) 108. For example, processing circuitry 110 may include one or more image signal processors associated with cameras 104 and/or sensor(s) 108, and/or a navigation processor associated with sensor(s) 108, which may include satellite-based positioning system components (e.g., Global Positioning System (GPS) or Global Navigation Satellite System (GLONASS)) as well as inertial positioning system components. Sensor(s) 108 may include direct depth sensing sensors, which may function to determine a depth of or distance to objects within the environment surrounding processing system 100 (e.g., surrounding a vehicle).

Processing system 100 also includes memory 160, which is representative of one or more static and/or dynamic memories, such as a dynamic random-access memory, a flash-based static memory, and the like. In this example, memory 160 includes computer-executable components, which may be applied by one or more of the aforementioned components of processing system 100.

Examples of memory 160 include random access memory (RAM), read-only memory (ROM), electrically erasable programmable ROM (EEPROM), compact disk ROM (CD-ROM), or another kind of hard disk. Examples of memory 160 include solid state memory and a hard disk drive. In some examples, memory 160 is used to store computer-readable, computer-executable software including instructions that, when applied, cause a processor to perform various functions described herein. In some cases, memory 160 contains, among other things, a basic input/output system (BIOS) which controls basic hardware or software operation such as the interaction with peripheral components or devices. In some cases, a memory controller operates memory cells of memory 160. For example, the memory controller can include a row decoder, column decoder, or both. In some cases, memory cells within memory 160 store information in the form of a logical state.

Processing system 100 may be configured to perform techniques for extracting features from image data, processing the features to generate BEV features, or any combination thereof. For example, processing circuitry 110 may include dynamic FOV unit 140. Dynamic FOV unit 140 may be implemented in software, firmware, and/or any combination of hardware described herein. As will be described in more detail below, dynamic FOV unit 140 may be configured to receive a plurality of camera images 168 captured by cameras 104. Dynamic FOV unit 140 may be configured to receive camera images 168 directly from cameras 104 or from memory 160.

Dynamic FOV unit 140 may be configured to extract features from camera images 168 in order to identify one or characteristics of one or more objects within a 3D environment. For example, dynamic FOV unit 140 may apply an encoder to extract, from camera images 168, a set of features (e.g., a set of perspective view features). An encoder may include one or more nodes that map input data into a representation of the input data in order to "extract" features of the data. Features may represent information output from the encoder that indicates one or more characteristics of the data. It may be beneficial for the encoder to output features of input data that accurately represent the input data. For example, it may be beneficial for the encoder to accurately output features that identify one or more characteristics of objects within a 3D environment.

Dynamic FOV unit 140 may, in some examples, transform the features extracted from camera images 168 into BEV features. In examples where processing system 100 is part of an ADAS for controlling a vehicle, it may be beneficial to transform extracted features into BEV features so that processing system 100 is more effectively able to control the vehicle's movement across the ground. For example, a ground vehicle may move across the ground without moving vertically above or below the ground. This means that transforming features extracted from the input data into BEV features may assist processing system 100 in controlling the vehicle to move based on a location of the vehicle from a perspective looking down at the ground relative to one or more objects from a perspective looking down at the ground.

The set of features extracted by the encoder from camera images 168 may, in some cases, represent perspective view features that include information corresponding to one or more objects within the 3D space corresponding to processing system 100 from the perspective of camera 104 within the 3D space. That is, the first set of features may include information corresponding to one or more objects within the 3D space from a perspective of the location of camera 104 looking at the one or more objects. Dynamic FOV unit 140 may, in some examples, project the set of features extracted by the encoder from camera images 168 onto a 2D grid such that the first set of features are transformed into a set of BEV features. The set of BEV features may represent information corresponding to the one or more objects within the 3D space from a perspective above the one or more objects looking down at the one or more objects.

Camera images 168 may include a set of camera images collected from each camera of cameras 104. In some examples, each camera of cameras 104 occupies a different camera view. For examples, cameras 104 may be positioned to capture information corresponding to an environment surrounding an object, such as an environment surrounding a vehicle. One or more cameras may be positioned to capture an environment in front of a vehicle, one or more cameras may be positioned to capture an environment on a left side of the vehicle, one or more cameras may be positioned to capture an environment on a right side of the vehicle, and one or more cameras may be positioned to capture an environment behind a vehicle.

In a camera view, objects may be distorted at edges of the camera view. For example, an object may appear more distorted at an edge of a camera view, and the object may appear less distorted at a center of the camera view. That is, distortion may increase as the object moves away from an optical axis. In some examples, dynamic FOV unit 140 may be configured to process camera images 168 to extract information corresponding to one or more objects in the environment surrounding an object, including one or more objects located at edges of camera views of cameras 104.

BEV networks may include a fixed FOV, which means that the BEV network processes a fixed rectangular region of camera images 168 input to the BEV network. In complex scenarios where objects in a scene include different scales, orientations, and distances from the camera sensor, it may be beneficial for processing system 100 to use dynamic FOV unit 140 to process camera images 168. For example, dynamic FOV unit 140 may use stochastic depth scaling to focus on regions of camera images that include information important for performing one or more tasks, such as controlling a vehicle.

In an FOV multi-camera system, the farther away an object is from the optical axis of a camera, the higher the distortion and smaller the area of object in camera images collected by the camera. Camera images collected by another camera with an overlapping view of the object may view the object as a larger patch, potentially due to a lower distance to the optical axis. This means that an FOV multi-camera system including fixed FOVs might not capture objects in multiple cameras as consistently as FOV multi-camera systems that implement dynamic FOVs. For example, if an FOV of a camera is set too small, the system might not be able to detect objects that are located at edges of camera images collected by the camera or objects far away from the sensor of the camera. On the other hand, if an FOV of a camera is set too large, the system may waste computational resources processing empty regions of camera images, which may reduce an efficiency of the system as compared with systems that implement dynamic FOV.

An FOV multi-camera system including fixed FOVs might not be able to adapt to changes in the scene as effectively as an FOV multi-camera system that implements dynamic FOV. For example, if an object enters the FOV of a camera, a system using fixed FOV might not be able to detect the object if the object is located outside the fixed FOV. This may represent a significant limitation in dynamic environments where the objects in the scene are constantly changing. An FOV multi-camera system that implements dynamic FOV may adapt to a scene and adjust the FOV based on the location and size of the objects in the scene. This may improve an accuracy of object detection and reduce the number of false positive occurrences as compared with systems that use fixed FOV. By using a dynamic FOV, a system may focus on the regions of the input image that are most relevant to the task at hand, which may improve accuracy and efficiency.

Dynamic FOV unit 140 may apply the encoder to extract, from a first set of image data based on a location of a first one or more objects within a first FOV of a first camera of cameras 104, a first set of perspective view features. Dynamic FOV unit 140 may apply the encoder to extract, from a second set of image data based on a location of a second one or more objects within a second FOV of a second camera of cameras 104, a second set of perspective view features. In some examples, the first set of image data may represent a first set of camera images of camera images 168 collected by the first camera of cameras 104. In some examples, the second set of image data may represent a second set of camera images of camera images 168 collected by the second camera of cameras 104. Dynamic FOV unit 140 is not limited to extracting a first set of perspective view features and a second set of perspective view features. Dynamic FOV unit 140 may extract a set of perspective view features corresponding to each camera of cameras 104.

The first FOV of the first camera of cameras 104 and the second FOV of the second camera of cameras 104 may overlap. That is, when an object is located within the overlapping region between the first FOV and the second FOV, the first camera and the second camera may both capture images that indicate characteristics of the object. Dynamic FOV unit 140 may extract the first set of perspective view features and the second set of perspective view features in a way that identifies information corresponding to the object in the overlapping region that is important for performing one or more tasks.

To apply the encoder to extract the first set of perspective view features, dynamic FOV unit 140 may use a first stochastic depth scaling function to extract the first set of perspective view features based on a distance of each object of the first one or more objects from the first camera. To apply the encoder to extract the second set of perspective view features, dynamic FOV unit 140 may use a second stochastic depth scaling function to extract the second set of perspective view features based on a distance of each object of the second one or more objects from the second camera. In some examples, the encoder may represent a residual network. There may be a stochastic depth scaling function corresponding to camera images captured by each camera of camera 104. When processing each camera image of camera images 168, dynamic FOV unit 140 may use the stochastic depth scaling function corresponding to the camera capturing the camera image.

Stochastic depth scaling is a technique used to improve training and generalization of deep neural networks, such as residual networks. Residual networks are a type of deep neural network architecture that uses skip connections or residual connections to address the vanishing gradient problem. Stochastic depth scaling is a regularization technique introduced to enhance training of very deep networks. A residual network may include a series of residual blocks, each containing one or more convolutional layers. Each block may be connected by a skip connection, which adds the output of the block to the input, allowing gradients to flow through the residual network.

Stochastic depth scaling may introduce an element of randomness during training by randomly skipping certain residual blocks during each training iteration. For example, the system may train a subnetwork, which is a shallower version of the full residual network, for each batch of data. The probability of skipping a block is determined based on a predefined probability distribution. In each training iteration, for each residual block in the network, the system may sample a random value from a uniform distribution between 0 and 1. If this value is less than a predefined threshold, the network may skip the block, and the network may pass the input to the next block. If the value is greater than the threshold, the network may include the block in the forward pass.

Stochastic depth scaling may act as a form of regularization by adding noise to the training process, preventing overfitting. Additionally, or alternatively, stochastic depth scaling may encourage the residual network to learn useful representations even when some blocks are omitted and stochastic depth scaling may enable training of very deep networks by making the networks shallower in each iteration, reducing the vanishing gradient problem. Stochastic depth scaling may hasten training by making forward and backward passes faster due to the network performing fewer operations.

In some examples, when dynamic FOV unit 140 uses the first stochastic depth scaling function to extract the first set of perspective view features and uses the second stochastic depth scaling function to extract the first set of perspective view features, dynamic FOV unit 140 applies the encoder to focus on camera image characteristics learned during training. For example, by using stochastic depth scaling during training of the encoder, the encoder may learn to extract features including relevant information. The first stochastic depth scaling function and the second stochastic depth scaling function may represent actions of the encoder to extract the first set of perspective view features and the second set of perspective view features learned during training.

Dynamic FOV unit 140 may, in some examples, generate a first set of input perspective view features based on the first set of image data collected by the first camera of cameras 104 and generate a second set of input perspective view features based on the second set of image data collected by the second camera of cameras 104. In some examples, a set of input perspective features may be referred to as an "input feature map." The first set of input perspective view features and the second set of input perspective view features may represent features that are generated by the encoder before the first stochastic depth scaling function and the second stochastic depth scaling function are applied. Dynamic FOV unit 140 is not limited to extracting two sets of input perspective view features. Dynamic FOV unit 140 may extract a set of input perspective view features corresponding to camera images captured by each camera of cameras 104.

Dynamic FOV unit 140 may determine a first camera pose corresponding to the first camera of cameras 104 and calculate, based on the first camera pose and the first FOV, a first FOV mask corresponding to the first camera of cameras 104. Dynamic FOV unit 140 may determine a second camera pose corresponding to the second camera of cameras 104 and calculate, based on the second camera pose and the second FOV, a second FOV mask corresponding to the second camera of cameras 104. Camera pose may refer to the position and orientation of a camera in a specific coordinate system. Camera pose may define how a camera is situated in relation to one or more objects captured by the camera. Dynamic FOV unit 140 is not limited to calculating two FOV masks. Dynamic FOV unit 140 may calculate an FOV mask for each camera of cameras 104 based on a pose of the camera.

In some examples, camera pose is represented by a combination of translation and rotation parameters. Translation specifies the location of the camera in the coordinate system. Translation may be represented as a vector that defines how far the camera is from a reference point in a 3D space. Rotation describes the orientation of a camera. Rotation be represented in various ways, such as Euler angles, quaternion, or rotation matrices, or any combination thereof. Rotation may determine how the camera is rotated relative to its initial position. Accurate camera pose may allow processing system 100 to determine a relationship between the real world and the images or video frames captured by the camera.

An FOV mask is a technique used to restrict or limit the portion of a virtual or real-world scene that is visible or rendered by a camera sensor. An FOV mask may mimic the behavior of a physical camera or sensor with a specific field of view. The FOV is the angular extent of an observable world that a camera sensor is configured to capture. In some examples, FOV is defined by an angle that covers the area from which the camera or sensor can perceive objects. An FOV mask is a visual representation of the FOV of a camera sensor. For example, an FOV mask may comprise shape such as a polygon or a cone that indicates what part of a scene may be considered by the camera sensor and what part may be ignored. When rendering a 3D scene or processing an image, processing system 100 may use an FOV to determine which objects or elements fall within an FOV of a camera. Objects or elements outside the FOV mask may be "masked out" or not considered in the rendering or processing. FOV masks may improve efficiency and realism in rendering and image processing by restricting the scope of what is within the FOV of a camera or sensor.

Dynamic FOV unit 140 may extract a first set of perspective view features based on a first set of input perspective view features (e.g., a first input feature map), a first stochastic depth scaling function, and a first FOV mask. For example, dynamic FOV unit 140 may multiply, for each spatial location of a set of spatial locations within a first set of input perspective view features extracted from an input camera image of camera images 168, the first set of input perspective view features, the first stochastic depth scaling function, and the first FOV mask. That is, each of the first set of input perspective view features, the first stochastic depth scaling function, and the first FOV mask may be a function of spatial location. A spatial location may include spatial coordinates. By multiplying the function for the first set of input perspective view features, the function for the first stochastic depth scaling function, and the function for the first FOV mask, dynamic FOV unit 140 may ensure that the first set of perspective view features includes information corresponding to one or more objects that is relevant to performing one or more actions.

Dynamic FOV unit 140 may extract a second set of perspective view features based on a second set of input perspective view features (e.g., a second feature map), a second stochastic depth scaling function, and a second FOV mask. For example, dynamic FOV unit 140 may multiply, for each spatial location of a set of spatial locations within a second set of input perspective view features extracted from an input camera image of camera images 168, the second set of input perspective view features, the second stochastic depth scaling function, and the second FOV mask. That is, each of the second set of input perspective view features, the second stochastic depth scaling function, and the second FOV mask may be a function of spatial location. A spatial location may include spatial coordinates. By multiplying the function for the second set of input perspective view features, the function for the second stochastic depth scaling function, and the function for the second FOV mask, dynamic FOV unit 140 may ensure that the second set of perspective view features includes information corresponding to one or more objects that is relevant to performing one or more actions.

In some examples, a first FOV of a first camera corresponding to the first set of perspective view features overlaps with a second FOV of a second camera corresponding to the second set of perspective view features. This means that one or more objects may be present in both images captured by the first camera and images captured by the second camera. Since the one or more objects located in the overlap region between the first FOV and the second FOV appear differently in images captured by the first camera and images captured by the second camera, dynamic FOV unit 140 may extract the first set of perspective view features and the second set of perspective view features in a way that indicates information corresponding to the one or more objects that is most relevant for performing tasks.

Dynamic FOV unit 140 is not limited to extracting a first set of perspective view features and a second set of perspective view features. Dynamic FOV unit 140 may extract a set of perspective view features from a set of camera images of camera images 168 corresponding to each camera of cameras 104. For example, when cameras 104 include four cameras, dynamic FOV unit 140 may extract four sets of perspective view features, when cameras 104 include five cameras, dynamic FOV unit 140 may extract five sets of perspective view features, and so on. In any case, dynamic FOV unit 140 may extract input perspective view features corresponding to each camera and extract perspective view features corresponding to each camera based on the input perspective view features, an FOV mask for the camera, and a stochastic depth scaling function for the camera.

Dynamic FOV unit 140 may project a first set of perspective view features corresponding to camera images captured by a first camera and a second set of perspective view features corresponding to camera images captured by a second camera onto a grid of BEV feature cells to generate a set of image data BEV features. The set of image data BEV features may provide information corresponding to a first one or more objects present in camera images of camera images 168 collected by the first camera and a second one or more objects present in camera images of camera images 168 collected by the second camera. In some examples, to project the first set of perspective view features and the second set of perspective view features onto the grid to generate the set of image data BEV features, dynamic FOV unit 140 is configured to perform one or more stochastic drop actions to drop one or more features of the first set of perspective view features and the second set of perspective view features. Dynamic FOV unit 140 may transform, using a least squares operation, the first set of perspective view features and the second set of perspective view features into the set of BEV features. Dynamic FOV unit 140 is not limited to projecting two sets of perspective view features onto the grid of BEV feature cells. Dynamic FOV unit 140 may project a set of perspective view feature corresponding to camera images collected by each camera of cameras 104 onto the grid of BEV feature cells.

Memory 160 is configured to store a set of training data 170 comprising a plurality of sets of training image data. In some examples, the plurality sets of training data include sets of training image data. Processing system 100 is configured to train, based on the plurality of sets of training image data of training data 170, the encoder applied by dynamic FOV unit 140 to extract perspective view features from camera images 168, wherein the encoder represents a residual network comprising a set of layers. To train the encoder, processing system 100 is configured to perform a plurality of training iterations using the plurality of sets of training image data.

During each training iteration of the plurality of training iterations, processing system 100 is configured to cause the residual network of the encoder to skip one or more layers of the set of layers. Processing system 100 may insert the skipped layers of the set of layers into the residual network to complete training of the encoder. To cause the residual network to skip one or more layers of the set of layers, processing system 100 is configured to determine whether to skip each layer of the set of layers according to a probability of skipping the layer. The probability of skipping the layer may be smaller when the layer corresponds to one or more objects and the probability of skipping the layer may be greater when the layer corresponds to a background region. Skipping layers during training may represent stochastic depth training. By using stochastic depth training to train the encoder, processing system 100 may improve an ability of the encoder to extract relevant information from input camera images as compared with systems that do not use stochastic depth training to train encoders.

Dynamic FOV unit 140 may output the set of image data BEV features to a decoder for processing. Dynamic FOV unit 140 may apply the decoder to process the set of image data BEV features to generate an output corresponding to processing system 100. In some examples, the decoder is configured to transform the set of image data BEV features that indicate information corresponding to camera images 168 to construct an output useful for performing one or more tasks. For example, the output from the decoder may represent a 3D representation and or a bird's eye view representation of one or more objects within a 3D space. That is, dynamic FOV unit 140 may generate the output based on BEV features corresponding to camera images 168 without generating the output based on BEV features corresponding to point cloud frames 166.

Although it is not necessary for dynamic FOV unit 140 to generate the output based on point cloud frames 166, dynamic FOV unit 140 may in some examples fuse features extracted from point cloud frames 166 with features extracted from camera images 168 for processing to generate the output. For example, the encoder that dynamic FOV unit 140 applies to the camera images 168 to extract the perspective view features may represent a first encoder. Dynamic FOV unit 140 may apply a second encoder to extract a set of 3D sparse features from point cloud frames 166. Dynamic FOV unit 140 may fuse image data BEV features generated based on camera images 168 with the position data BEV features generated based on point cloud frames 166. Fusing the image data BEV features and the position data BEV features may associate information corresponding to characteristics of camera images 168 with information corresponding to characteristics of point cloud frames 166. In some examples, each of the image data BEV features and the position data BEV features comprise a grid of BEV feature cells. Fusing image data BEV features and position data BEV features may involve fusing each BEV feature cell of the image data BEV features with a corresponding BEV feature cell of the position data BEV features.

Dynamic FOV unit 140 may output the fused sets of BEV features to the decoder for processing. Dynamic FOV unit 140 may apply the decoder to process the fused sets of BEV features to generate the output. In some examples, the decoder is configured to transform the fused sets of BEV features that represent combined data encoded by the first encoder and the second encoder to construct an output that represents a combination of point cloud frames 166 and camera images 168. For example, the output from the decoder may represent a 3D representation and or a bird's eye view representation of one or more objects within a 3D space including position data indicating a location of the objects relative to the processing system 100 and image data indicating an identity of the objects.

In some examples, processing circuitry 110 may be configured to train one or more encoders and/or decoders applied by dynamic FOV unit 140 using training data 170. For example, training data 170 may include one or more training point cloud frames and/or one or more camera images. Training data 170 may additionally or alternatively include features known to accurately represent one or more point cloud frames and/or features known to accurately represent one or more camera images. This may allow processing circuitry to train an encoder to generate features that accurately represent point cloud frames and train an encoder to generate features that accurately represent camera images. Processing circuitry 110 may also use training data 170 to train one or more decoders.

Processing circuitry 110 of controller 106 may apply control unit 142 to control, based on the output generated by dynamic FOV unit 140 by applying the decoder to the fused sets of BEV features, an object (e.g., a vehicle, a robotic arm, or another object that is controllable based on the output from dynamic FOV unit 140) corresponding to processing system 100. Control unit 142 may control the object based on information included in the output generated by dynamic FOV unit 140 relating to one or more objects within a 3D space including processing system 100. For example, the output generated by dynamic FOV unit 140 may include an identity of one or more objects, a position of one or more objects relative to the processing system 100, characteristics of movement (e.g., speed, acceleration) of one or more objects, or any combination thereof. Based on this information, control unit 142 may control the object corresponding to processing system 100. The output from dynamic FOV unit 140 may be stored in memory 160 as model output 172.

The techniques of this disclosure may also be performed by external processing system 180. That is, encoding input data, transforming features into BEV features, weighing features, fusing features, and decoding features, may be performed by a processing system that does not include the various sensors shown for processing system 100. Such a process may be referred to as "offline" data processing, where the output is determined from a set of test point clouds and test images received from processing system 100. External processing system 180 may send an output to processing system 100 (e.g., an ADAS or vehicle).

External processing system 180 may include processing circuitry 190, which may be any of the types of processors described above for processing circuitry 110. Processing circuitry 190 may include dynamic FOV unit 194 that is configured to perform the same processes as dynamic FOV unit 140. Processing circuitry 190 may acquire point cloud frames 166 and/or camera images 168 directly from LiDAR system 102 and camera 104, respectively, or from memory 160. Though not shown, external processing system 180 may also include a memory that may be configured to store point cloud frames, camera images, model outputs, among other data that may be used in data processing. Dynamic FOV unit 194 may be configured to perform any of the techniques described as being performed by dynamic FOV unit 140. Control unit 196 may be configured to perform any of the techniques described as being performed by control unit 142.

Figure 2:
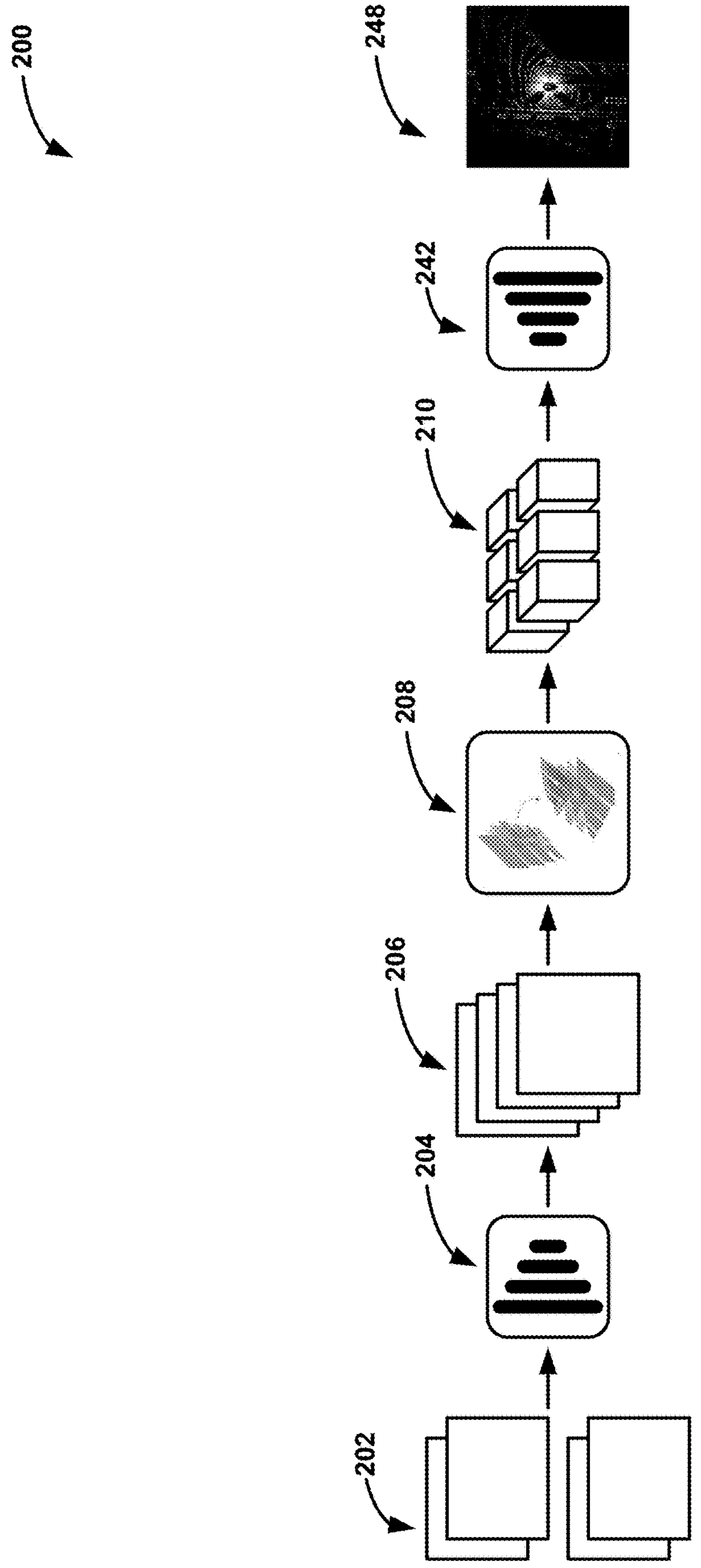
FIG. 2 is a block diagram illustrating an encoder-decoder architecture for processing image data and position data to generate an output, in accordance with one to more techniques of this disclosure.

FIG. 2 is a block diagram illustrating an encoder-decoder architecture 200 for processing image data and position data to generate an output, in accordance with one to more techniques of this disclosure. In some examples, dynamic FOV unit 140 and/or dynamic FOV unit 194 of FIG. 1 may be configured to apply one or more elements of encoder-decoder architecture 200. FIG. 2 illustrates camera images 202, encoder 204, perspective view features 206, projection unit 208, a set of image data BEV features 210, decoder 242, and output 248.

Camera images 202 may be examples of camera images 168 of FIG. 1. In some examples, camera images 202 may represent a set of camera images from camera images 168 and camera images 168 may include one or more camera images that are not present in camera images 202. In some examples, camera images 202 may be received from a plurality of cameras at different locations and/or different fields of view, which may be overlapping. In some examples, encoder-decoder architecture 200 processes camera images 202 in real time or near real time so that as camera 104 captures camera images 202, encoder-decoder architecture 200 processes the captured camera images. In some examples, camera images 202 may represent one or more perspective views of one or more objects within a 3D space where processing system 100 is located. That is, the one or more perspective views may represent views from the perspective of processing system 100.

Encoder-decoder architecture 200 including encoder 204 decoder 242 represent an encoder-decoder architecture for processing image data and position data. An encoder-decoder architecture for image feature extraction is commonly used in computer vision tasks, such as image captioning, image-to-image translation, and image generation. Encoder-decoder architecture 200 may transform input data into a compact and meaningful representation known as a feature vector that captures salient visual information from the input data. The encoder may extract features from the input data, while the decoder reconstructs the input data from the learned features.

In some cases, an encoder is built using convolutional neural network (CNN) layers to analyze input data in a hierarchical manner. The CNN layers may apply filters to capture local patterns and gradually combine them to form higher-level features. Each convolutional layer extracts increasingly complex visual representations from the input data. These representations may be compressed and down-sampled through operations such as pooling or strided convolutions, reducing spatial dimensions while preserving essential information. The final output of the encoder may represent a flattened feature vector that encodes the input data's high-level visual features.

A CNN may, in some examples, represent a residual network. CNNs may include multiple layers of convolutional, pooling, and fully connected layers. These layers may be stacked sequentially, and information may flow from one layer to the next in a linear fashion. A residual network may represent a type of CNN including a one or more skip connections. These skip connections may allow the output of one layer to bypass one or more intermediate layers and directly connect to a deeper layer of the residual network. In CNNs, as the network becomes deeper, gradients that are propagated backward during training may become very small. This is known as the vanishing gradient problem. Skip connections in residual networks may alleviate the vanishing gradient problem. For example, skip connections may provide shortcuts for gradients to flow directly back through the network, making it easier to train deep networks. This may allow creation of deep networks without loss of gradient information.

A decoder may be built using transposed convolutional layers or fully connected layers. A decoder may reconstruct the input data from the learned feature representation. For example, a decoder may take a feature vector obtained from the encoder as input and process the feature vector to generate an output that is similar to the input data. The decoder may up-sample and expand the feature vector, gradually recovering spatial dimensions lost during encoding. A decoder may apply transformations, such as transposed convolutions or deconvolutions, to reconstruct the input data. The decoder layers may progressively refine the output, incorporating details and structure until a visually plausible image is generated.

During training, an encoder-decoder architecture for feature extraction may be trained using a loss function that measures the discrepancy between the reconstructed image and the ground truth image. This loss may guide the learning process, encouraging the encoder to capture meaningful features and the decoder to produce accurate reconstructions. The training process may involve minimizing the difference between the generated image and the ground truth image, typically using backpropagation and gradient descent techniques. Encoders and decoders of the encoder-decoder architecture may be trained using training data 170.

An encoder-decoder architecture for image and/or position feature extraction may comprise one or more encoders that extract high-level features from the input data and one or more decoders that reconstruct the input data from the learned features. This architecture may allow for the transformation of input data into compact and meaningful representations. The encoder-decoder framework may enable the model to learn and utilize important visual and positional features, facilitating tasks like image generation, captioning, and translation.

Encoder 204 may represent an encoder of a neural network or another kind of model that is configured to extract information from input data and process the extracted information to generate an output. In general, encoders are configured to receive data as an input and extract one or more features from the input data. The features are the output from the encoder. The features may include one or more vectors of numerical data that can be processed by a machine learning model. These vectors of numerical data may represent the input data in a way that provides information concerning characteristics of the input data. In other words, encoders are configured to process input data to identify characteristics of the input data.

In some examples, the encoder 204 represents a CNN, a residual network, another kind of artificial neural network (ANN), or another kind of model that includes one or more layers and/or nodes. Each layer of the one or more layers may include one or more nodes. Examples of layers include input layers, output layers, and hidden layers between the input layers and the output layers. A CNN, for example, may include one or more convolutional layers comprising convolutional filters. Each convolutional filter may perform one or more mathematical operations on the input data to detect one or more features such as edges, shapes, textures, or objects. CNNs may additionally or alternatively include activation functions that identify complex relationships between elements of an image and pooling layers that recognize patterns regardless of location within the image frame.

Processing system 100 may train encoder 204 using training data 170. For example, processing system 100 may train encoder 204 using stochastic depth training techniques. Deep networks trained with stochastic depth training techniques represent a type of deep neural network architecture that use a stochastic dropout-like mechanism to randomly skip entire layers during training. A network that is trained using stochastic depth may improve a training of the network as compared with networks that are not trained using stochastic depth, because stochastic depth training may reduce the vanishing gradient problem and improve generalization. Stochastic depth involves randomly skipping layers during training. During each training iteration, the network randomly skips some layers, effectively creating a shorter network with fewer layers. The skipped layers are then added back in during inference, creating a full network.

In some examples, encoder-decoder architecture 200 may be part of a multi-camera BEV 3D object detection framework. Stochastic dynamic FOV layers may improve an ability of encoder 204 to extract features indicating information corresponding to one or more objects of an environment captured by cameras 104 as compared with encoders that do not include stochastic dynamic FOV layers. When encoder 204 is trained, encoder 204 may apply the stochastic dynamic FOV approach to extract perspective view features 206 from camera images 202, allowing for a dynamic FOV that adapts to the size and location of objects in a scene captured in camera images 202.

Processing system 100 may use a stochastic dynamic FOV approach to create stochastic dynamic FOV layers in encoder 204. Processing system 100 may modify a residual network architecture of encoder 204 to randomly skip layers during training. The probability of skipping a given layer may be based on the size and location of an objects in a scene captured by camera images 202, with smaller probabilities assigned to layers that correspond to regions of an image containing objects and higher probabilities assigned to layers corresponding to background regions. The probability of skipping a layer in terms of a receptive field size and position of the layer is given by the following equation.

$$P(i) = \min\left(1, \max\left(0, \left(\alpha \frac{R(i)}{R_{max}}\right) - \beta\right)\right) \quad \text{(eq. 1)}$$

In some examples, P(i) is the probability of skipping layer i of the set of stochastic dynamic FOV layers of encoder 204, R(i) is the receptive field size of layer i, $R_{max}$ is the maximum receptive field size in the residual network of encoder 204, and α and β represent hyperparameters that control a range and offset of the probability function. During training, the residual network of encoder 204 may be modified with stochastic dynamic FOV layers to create a shorter network with a smaller FOV that focuses on a specific region of the camera images 202. The specific regions of the camera images 202 that the stochastic dynamic FOV layers may include regions that indicate one or more objects within a scene captured by cameras 104 that are relevant for performing one or more actions such as controlling a vehicle.

In the context of image processing and CNNs such as residual networks, receptive field size may refer to the region of a camera image of camera images 202 that a particular neuron in a neural network layer is sensitive to. Receptive field size may indicate an area of the camera images image that influences a value of the respective neuron in the residual network of encoder 204. Residual networks may include one or more residual blocks. In a residual block, an output of a layer is combined with an input to the layer through a skip connection. This may allow for the residual network to learn residual functions such as a difference between a desired output and an actual output. A receptive field size in a residual network may depend on a specific layer or residual block. In a convolutional layer, a receptive field size may be determined by a size of the convolutional filters and a number of layers in the network. Deeper into the network, the receptive field size increases. This means that neurons in deeper layers may have a broader view of the input image and capture a greater number of global features.

In a residual network, skip connections may influence an effective receptive field. While a single convolutional layer might have a limited receptive field, the presence of skip connections may allow information from a larger portion of the camera image to be considered in a final prediction. Skip connections represent an advantage of residual networks in maintaining information flow in deep networks. The receptive field size in a residual network may vary depending on a depth of the network and the specific layer, but receptive field size generally increases as moving deeper into the residual network. Skip connections may play a role in influencing an effective receptive field of neurons in the network.

Encoder 204 may extract perspective view features 206 based on camera images 202. Perspective view features 206 may provide information corresponding to one or more objects depicted in camera images 202 from the perspective of camera 104 which captures camera images 202. For example, perspective view features 206 may include vanishing points and vanishing lines that indicate a point at which parallel lines converge or disappear, a direction of dominant lines, a structure or orientation of objects, or any combination thereof. Perspective view features 206 may include key points that are matched across a group of two or more camera images of camera images 202. Key points may allow encoder-decoder architecture 200 to determine one or more characteristics of motion and pose of objects. Perspective view features 206 may, in some examples, include depth-based features that indicate a distance of one or more objects from the camera, but this is not required. Perspective view features 206 may include any one or combination of image features that indicate characteristics of camera images 202.

A multi-camera system including cameras 104 may capture camera images 202. That is, each camera of cameras 104 may capture one or more camera images of camera images 202. Each camera of cameras 104 may have an FOV. The FOVs of one or more pairs of cameras of cameras 104 may overlap. This means that camera images 202 may represent different views of an environment surrounding the multi-camera system. One or more objects may be located in two or more views of the multi-camera system. Encoder 204 may extract perspective view features 206 so that perspective view features 206 include a set of perspective view features 206 corresponding to camera images collected by each camera of cameras 104. This way, perspective view features 206 may include information present in the FOV of each camera of cameras 104.

To extract a set of perspective view features of perspective view features 206 from one or more camera images of camera images 202 collected by each camera of cameras 104, encoder 204 may extract an input feature map from one or more camera images of camera images 202 captured by each camera of cameras 104. In some examples, the encoder 204 may extract the input feature maps from camera images 202 so that each input feature map includes features corresponding to each spatial location of a plurality of spatial locations. For example, a spatial location may include spatial coordinates, e.g., (i, j). At each spatial location of the plurality if spatial locations, an input feature map may include one or more input features. In some examples, an input feature map corresponding to camera k may be represented as F(i, j, k).

To extract a set of perspective view features of perspective view features 206 from one or more camera images collected by each camera of cameras 104, encoder 204 may identify an FOV mask corresponding to each camera of cameras 104. In some examples, an FOV mask corresponding to each camera of cameras 104 may depend on the pose of the camera. Camera pose may include a camera position and a camera orientation. Processing system 100 may estimate camera pose using techniques such as visual odometry, simultaneous localization and mapping (SLAM), or global positioning system (GPS) data or inertial measurement unit (IMU) data. Camera pose may be denoted by the equation T=[R|t], where R represents a 3×3 rotation matrix and t represents a 3×1 translation vector.

Based on an estimated camera pose for each camera of cameras 104, processing system 100 may determine an FOV mask for each camera of cameras 104. The FOV mask for camera k may be referred to as $M_k$. Processing system 100 may use camera intrinsic values to determine an FOV mask for each camera of cameras 104 so that the same FOV size and location is be maintained across each camera of cameras 104. The FOV mask for camera k may be calculated using the following equation.

$$M_k(i, j) = \begin{cases} 1 \text{ if } \left(\frac{i - cx_k}{fx_k}, \frac{j - cy_k}{fy_k}\right) \text{ is in the } FOV \text{ of camera } k \\ 0 \text{ otherwise} \end{cases} \quad \text{(eq. 2)}$$

The FOV mask $M_k$ corresponding to camera k may represent a binary matrix with the same shape as input feature map F(i, j, k) corresponding camera images collected by camera k. In some examples, input feature maps F may include an input feature map for each camera of cameras 104, including input feature map F(i, j, k) corresponding to camera images collected by camera k. According to the equation for the FOV mask $M_k$, each element is set to 1 if it falls within the FOV of camera k, and is set to 0 if the element falls outside of the FOV of camera k. By using the camera intrinsic values to define an FOV mask for each camera of cameras 104, processing system 100 may ensure that the stochastic dynamic FOV layers of the residual network of encoder 204 adapt to the same FOV size and location across different camera views, leading to more consistent and accurate feature extraction as compared with systems that do not calculate FOV masks.

In some examples encoder 204 may extract perspective view features 206 based on a stochastic depth scaling function corresponding to camera images collected by each camera of cameras 104. In some examples, a value output from a stochastic depth scaling function may be referred to as a "stochastic depth scaling factor." In some examples, processing system 100 may determine a stochastic depth function for camera images corresponding to each camera of cameras 104 as processing system 100 trains encoder 204. This means that there may be an input feature map, an FOV mask, and a stochastic depth scaling function corresponding to each camera of cameras 104. In some examples, a stochastic depth scaling function may indicate, based on each spatial coordinate of a plurality of spatial coordinates, stochastic depth scaling factor for input features at the spatial coordinate. For example, a stochastic depth scaling function P may indicate a stochastic depth scaling factor P(i, j) for each spatial location (i, j) in an input feature map F(i, j, k) corresponding to the same camera as the camera corresponding to the stochastic depth scaling function P. A stochastic depth scaling function P may be given by the following equation.

$$P(i, j) = \min\left(1, \max\left(0, \left(\alpha \frac{R(i, j)}{R_{max}}\right) - \beta\right)\right) \quad \text{(eq. 3)}$$

In some examples, R(i, j) may represent a distance from a spatial location (i, j) to a location of a camera of cameras 104, α and β represent hyperparameters, and $R_{max}$ represents a normalization factor. The stochastic depth scaling factor P(i, j) may represent a value between 0 and 1 that scales a depth of a stochastic dynamic FOV layer of the residual network of the encoder 204 in a stochastic manner based on a distance from a camera of cameras 104 corresponding to the stochastic depth scaling function P.

Based on the FOV mask, the stochastic depth scaling factor, and the input feature map corresponding to the one or more camera images of camera images 202 captured by each camera of cameras 104, encoder 204 may extract an output feature map $F_d$. That is, encoder 204 may extract an output feature map $F_d$ corresponding to camera images captured by each camera of cameras 104. To extract an output feature map $F_d$(i, j, k) corresponding to camera images captured by camera k, for each spatial location of a plurality of spatial locations, encoder 204 may apply a stochastic dynamic FOV layer to the input feature map F(i, j, k) corresponding to camera k. The output feature map $F_d$(i, j, k) corresponding to camera k may be defined by the following equation.

$$F_d(i, j, k) = m_k(i, j) \cdot P(i, j) \cdot F(i, j, k) \quad \text{(eq. 4)}$$

In some examples, F(i, j, k) is a stochastic dynamic FOV feature map (e.g., an input feature map) at a spatial location (i, j) in an FOV of camera k, $m_k$(i, j) represents a stochastic dynamic FOV mask that indicates whether a corresponding region in the input feature map lies within the FOV of camera k, and P(i, j) represents a stochastic depth scaling function P corresponding to camera k at each spatial location (i, j). To extract output feature map $F_d$(i, j, k) corresponding to camera k, encoder 204 may multiply $m_k$(i, j), P(i, j), and F(i, j, k). In some examples, perspective view features 206 may include the output feature map $F_d$ for each camera of cameras 104. That is, encoder-decoder architecture 200 may combine the output feature map for each camera of cameras 104 to create perspective view features 206.

To further enhance a stochasticity of a stochastic dynamic FOV layer, encoder 204 may use stochastic drop connections. For example, encoder 204 may randomly skip a fraction of the feature channels for each spatial location. The probability of skipping a feature channel for a spatial location (i, j) may be 1−P(i, j). Stochastic drop connections may be defined by the following equation.

$$F_{drop}(i, j, k) = P(i, j) \cdot F(i, j, k) \cdot \text{mask}(i, j, k) \quad \text{(eq. 5)}$$

In some examples, mask (i, j, k) represents a binary mask for camera k including the same shape as the input feature map F(i, j, k) corresponding to camera k. In some examples, mask (i, j, k) causes each element of the input feature map F(i, j, k) to be set to 1 with a probability of P(i, j) and set to 0 otherwise. The output feature map $F_{drop}$(i, j, k) may be transformed to BEV features using the least squares (LSS) approach.

Projection unit 208 may transform perspective view features 206 into a set of image data BEV features 210. In some examples, projection unit 208 may generate a 2D grid and project the perspective view features 206 onto the 2D grid. For example, projection unit 208 may perform perspective transformation to place objects closer to cameras 104 on the 2D grid and place objects further from cameras 104 on the 2D grid. In some examples, the 2D grid may include a predetermined number of rows and a predetermined number of columns, but this is not required. Projection unit 208 may, in some examples, set the number of rows and the number of columns. In any case, projection unit 208 may generate the set of image data BEV features 210 that represent information present in perspective view features 206 on a 2D grid including the one or more objects from a perspective above the one or more objects looking down at the one or more objects.

Projection unit 208 may create dynamic FOV BEV grids to improve an adaptability and efficiency of encoder-decoder architecture 200 by allowing encoder-decoder architecture 200 to focus on the most relevant regions of the BEV space. The most relevant regions of the BEV space may represent regions indicating objects important for performing one or more tasks. For example, when a task involves controlling a vehicle, relevant regions of the BEV space may include one or more traffic lights and/or signs, one or more vehicles, one or more other vehicles, or any combination thereof. Projection unit 208 may modify the BEV grid by dynamically adjusting a size and location of the grid based on a size and location of objects in the scene. This may allow the network to focus its attention on the regions of the BEV space that are most likely to contain objects, while ignoring regions that are less relevant.

In some examples, Projection unit 208 may define a set of anchor points in the BEV space, which would represent corners of the BEV grid. These anchor points may be selected to cover the entire BEV space, with a higher concentration of points in regions that are more likely to contain objects. For example, Projection unit 208 may use a density-based clustering algorithm to identify regions of high object density in the BEV feature map and use these regions as a guide for placing the anchor points.

During training of projection unit 208, processing system 100 may randomly sample a subset of anchor points to define a current FOV of the projection unit 208. Projection unit 208 may then transform perspective view features 206 to the set of image data BEV features using the LSS approach for a region of the BEV grid defined by the current FOV. This may create a smaller set of BEV features that focuses on the most relevant regions of the scene as compared with systems that do not use dynamic BEV grids, improving both accuracy and efficiency. To implement dynamic FOV in a BEV grid, projection unit 208 may randomly select different subsets of anchor points for each training iteration. This may create a different FOV for each iteration, allowing the network to adapt to a size and location of objects in the scene.

Projection unit 208 may also modify a decoder architecture to randomly skip channels during training. The probability of skipping a given channel would be based on a location and size of the objects in the scene, with smaller probabilities assigned to channels that correspond to regions of the BEV feature map containing objects and higher probabilities assigned to channels corresponding to background regions. The skipped channels are added back in during inference, creating a full network that can process the entire BEV feature map. The following equation may define a probability of skipping a given channel in terms of a spatial location and a size of an object.

$$P(i, j, k) = \min\left(1, \max\left(0, \left(\alpha \cdot \frac{S(i, j, k)}{S_{max}}\right) - \beta\right)\right) \quad \text{(eq. 6)}$$

In some examples, P(i, j, k) is a probability of skipping a channel (i, j, k), S(i, j, k) may represent the size of an object at s spatial location, $S_{max}$ may represent a maximum object size in the BEV feature map, and α and β my represent hyperparameters that control a range and offset of the probability function.

Projection unit 208 may output the set of image data BEV features 210 to decoder 242. In some examples, decoder 242 may include a decoder that includes a series of transformation layers. Each transformation layer of the set of transformation layers may increase one or more special dimensions of the set of image data BEV features 210, increase a complexity of the set of image data BEV features 210, or increase a resolution of the set of image data BEV features 210. A final layer of the decoder 242 may generate a reconstructed output that includes an expanded representation of the perspective view features 206 output by encoder 204.

Decoder 242 may process the set of image data BEV features 210 to generate an output 248. In some examples, the output 248 may include a set of 3D bounding boxes that indicate a shape and a position of one or more objects within a 3D environment. In some examples, it may be important to generate 3D bounding boxes to determine an identity of one or more objects and/or a location of one or more objects. When processing system 100 is part of an ADAS for controlling a vehicle, processing system 100 may use the output 248 to control the vehicle within the 3D environment. A control unit (e.g., control unit 142 and/or control unit 196 of FIG. 1) may process the output 248 to perform one or more actions.

In some examples, decoder 242 may represent a first decoder and output 248 may represent a first output. Encoder-decoder architecture 200 may include a second decoder configured to process the set of image data BEV features 210 to generate a second output. The second output may comprise a 2D BEV representation of the 3D environment corresponding to processing system 100. For example, when processing system 100 is part of an ADAS for controlling a vehicle, the second output may indicate a BEV view of one or more roads, road signs, road markers, traffic lights, vehicles, pedestrians, and other objects within the 3D environment corresponding to processing system 100. This may allow processing system 100 to use the second output to control the vehicle within the 3D environment.

Since the second output from second decoder may include a bird's eye view of one or more objects that are in a 3D environment corresponding to encoder-decoder architecture 200, a control unit (e.g., control unit 142 and/or control unit 196 of FIG. 1) may use the second output from the second decoder to control an object (e.g., a vehicle, one or more robotic components) within the 3D environment. For example, when the second output from the second decoder indicates a vehicle ahead of a vehicle corresponding to processing system 100, the control unit may control the vehicle to change lanes to pass the other vehicle. In another example, when the second output from the second decoder indicates a stop sign ahead, the control unit may control the vehicle to stop at an intersection.

Encoder-decoder architecture 200 may be configured to process camera images 202 to generate output 248 without processing point cloud frames collected by LiDAR system 102. In some examples, encoder-decoder architecture 200 may process both camera images 202 and point cloud frames collected by LiDAR system 102 to generate an output for performing one or more tasks. For example, encoder-decoder architecture 200 may process a set of point cloud frames from point cloud frames 166 of FIG. 1. In some examples, encoder-decoder architecture 200 processes the set of point cloud frames in real time or near real time so that as LiDAR system 102 generates the point cloud frames. In some examples, the set of point cloud frames may represent collections of point coordinates within a 3D space (e.g., x, y, z coordinates within a Cartesian space) where LiDAR system 102 is located. Since LiDAR system 102 is configured to emit light signals and receive light signals reflected off surfaces of one or more objects, the collections of point coordinates may indicate a shape and a location of surfaces of the one or more objects within the 3D space.

Encoder 204 which extracts features from camera images 202 may represent a first encoder. Encoder-decoder architecture 200 may include a second encoder that is configured to extract information from input point cloud frames and process the extracted information to generate an output. The second encoder may be similar to encoder 204 in that both the encoder 204 and the second encoder are configured to process input data to generate output features. But in some examples, encoder 204 is configured to process 2D input data and the second encoder is configured to process 3D input data.

In some examples, processing system 100 is configured to train encoder 204 using a set of training data of training data 170 that includes one or more training camera images and processing system 100 is configured to train the second encoder using a set of training data of training data 170 that includes one or more training point cloud frames. That is, processing system 100 may train encoder 204 to recognize one or more patterns in camera images that correspond to certain camera image perspective view features and processing system 100 may train the second encoder to recognize one or more patterns in point cloud frames that correspond to certain 3D sparse features. In some examples, the second encoder represents a CNN, a residual network, another kind of ANN, or another kind of model that includes one or more layers and/or nodes. Each layer of the one or more layers may include one or more nodes.

The second encoder may generate a set of 3D sparse features based on the input set of point cloud frames. The 3D sparse features may provide information corresponding to one or more objects indicated by point cloud frames within a 3D space. The 3D sparse features may include key points within point cloud frames that indicate unique characteristics of the one or more objects. For example, key points may include corners, straight edges, curved edges, peaks of curved edges. Encoder-decoder architecture 200 may recognize one or more objects based on these key points. The 3D sparse features may additionally or alternatively include descriptors that allow the second encoder to compare and track key points across groups of two or more point cloud frames. Other kinds of 3D sparse features include voxels and super pixels.

Encoder-decoder architecture 200 may include a flattening unit for transforming the 3D sparse features into a set of position data BEV features. In some examples, the flattening unit may define a 2D grid of cells and project the 3D sparse features onto the 2D grid of cells. For example, the flattening unit may project 3D coordinates of 3D sparse features (e.g., cartesian coordinates key points, voxels) onto a corresponding 2D coordinate of the 2D grid of cells. The flattening unit may aggregate one or more sparse features within each cell of the 2D grid of cells. For example, the flattening unit may count a number of features within a cell, average attributes of features within a cell, or take a minimum or maximum value of a feature within a cell. The flattening unit may normalize the features within each cell of the 2D grid of cells, but this is not required. The flattening unit may flatten the features within each cell of the 2D grid of cells into a 2D array representation that captures characteristics of the 3D sparse features projected into each cell of the 2D grid of cells.

In examples where encoder-decoder architecture 200 processes both camera images and point cloud frames, encoder-decoder architecture 200 may include a data fusion unit configured to fuse the set of image data BEV features 210 corresponding to camera images 202 and the set of position data BEV features corresponding to the point cloud frames. In some examples, to fuse the set of image data BEV features 210 and the set of position data BEV features, the data fusion unit may combine one or more features within each cell of a BEV feature grid corresponding to the set of image data BEV features 210 with one or more features within a corresponding cell of a BEV feature grid corresponding to the set of position data BEV features. The data fusion unit may output the fused set of BEV features to decoder 242. Decoder 242 may process the fused set of BEV features to generate an output 248. It is not necessary for encoder-decoder architecture 200 to process point cloud frames. In some examples, encoder-decoder architecture 200 may generate the output 248 based on camera images 202 without processing any point cloud frames.

Figure 3:
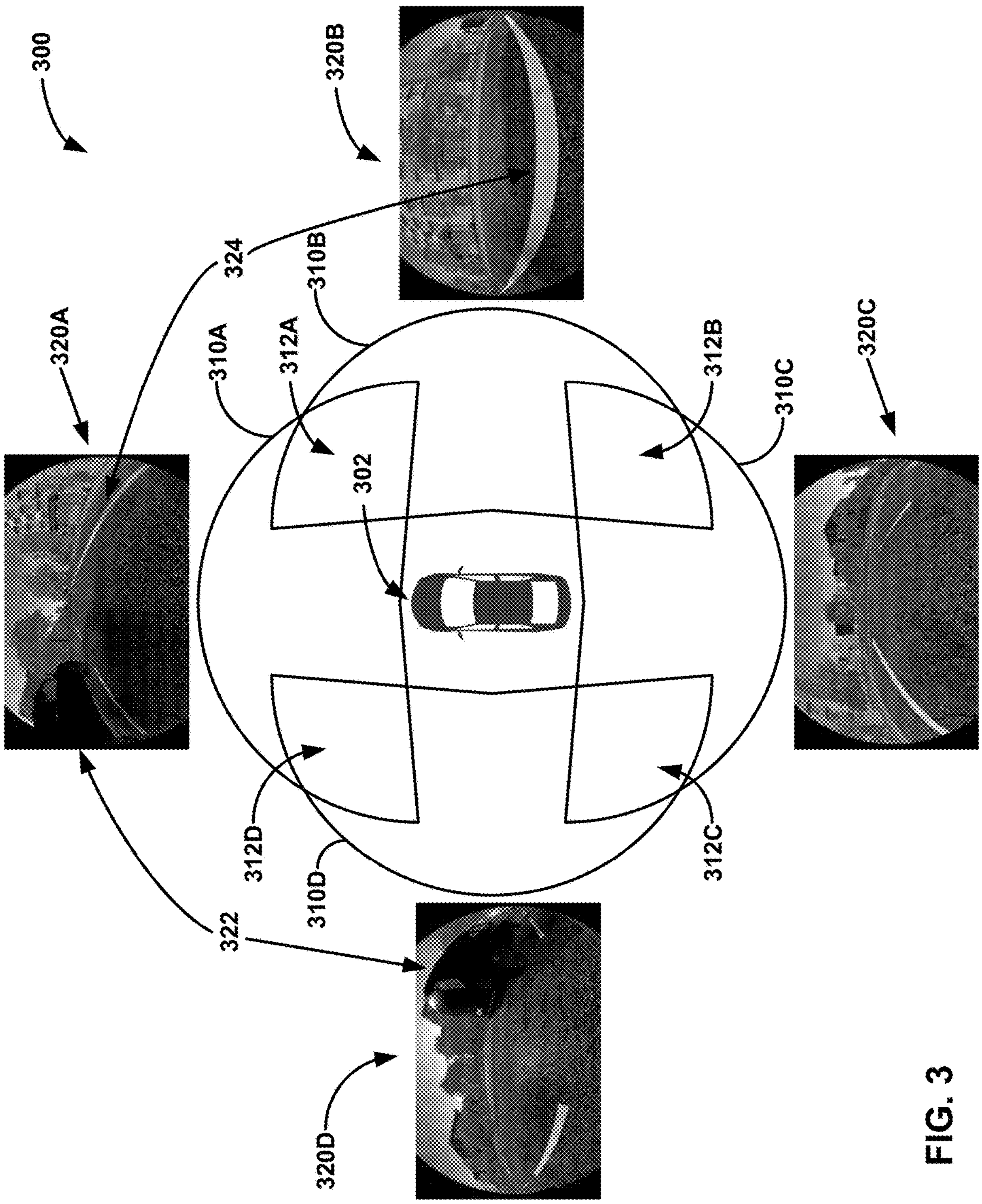
FIG. 3 is a conceptual diagram illustrating an environment including a vehicle as captured by one or more near-field cameras, in accordance with one or more techniques of this disclosure.

FIG. 3 is a conceptual diagram illustrating an environment 300 including a vehicle 302 as captured by one or more near-field cameras, in accordance with one or more techniques of this disclosure. As seen in FIG. 3, environment 300 may include vehicle 302, a set of FOVs 310A-310D (collectively, "FOVs 310"), a set of FOV overlap regions 312A-312D (collectively, "FOV overlap regions 312"), and a set of camera images 320A-320D (collectively, "camera images 320"). In some examples, each FOV of the set of FOVs may correspond to a camera of cameras 104 of FIG. 1. In some examples, each camera image of camera images 320 may correspond to an FOV of FOVs 310.

In some examples, four cameras may be located on vehicle 302, each camera including an FOV of FOVs 310. For example, a first camera may include FOV 310A, a second camera may include FOV 310B, a third camera may include 310C, and a fourth camera may include FOV 310D. This means that each of the four cameras may capture a different view of environment 300. FOVs 310 may overlap with each other. For example, FOV 310A overlaps with FOV 310B at FOV overlap region 312A, FOV 310B overlaps with FOV 310C at FOV overlap region 312B, FOV 310C overlaps with FOV 310D at FOV overlap region 312C, and FOV 310D overlaps with FOV 310A at FOV overlap region 312D.

FOV overlap regions 312 may, in some examples, include one or more objects such that one or more objects appear in camera images captured by more than one camera. For example, vehicle 322 may appear in both camera image 320A and camera image 320D because vehicle 322 is located within FOV overlap region 312D. This means that a camera corresponding to FOV 310A and a camera corresponding to FOV 310D may both capture at least a portion of vehicle 322. The camera corresponding to FOV 310A and the camera corresponding to FOV 310D may each capture a different view of vehicle 322. For example, the camera corresponding to FOV 310A may capture a view of vehicle 322 including a front portion of the vehicle and the camera corresponding to FOV 310D may capture a view of vehicle 322 including both a rear portion and the front portion of vehicle 322. The front portion of vehicle 322 is distorted to appear smaller in camera image 320D because the front portion is more displaced from an optical axis of the camera as compared with a displacement of the rear portion of vehicle 322.

Road surface marking 324 may appear in both camera image 320A and camera image 320B because road surface marking 324 is located within FOV overlap region 312A. This means that a camera corresponding to FOV 310A and a camera corresponding to FOV 310B may both capture at least a portion of road surface marking 324. The camera corresponding to FOV 310A and the camera corresponding to FOV 310B may each capture a different view of road surface marking 324. For example, the camera corresponding to FOV 310A may capture a view of road surface marking 324 where road surface marking 324 extends from a lower right portion of FOV 310A towards a center of FOV 310A away from the camera. The camera corresponding to FOV 310B may capture a view of road surface marking 324 where road surface marking 324 extends across FOV 310B. Even though road surface marking 324 is a straight line, it appears curved in camera image 320B due to distortion at the edges of FOV 310B.

Dynamic FOV unit 140 of FIG. 1 may process camera images 320 in a way that focuses on important portions of camera images 320, even when these important portions are distorted or include objects far from the camera. For example, characteristics of vehicle 322 and road surface marking 324 may be important for controlling vehicle 302. This is because vehicle 302 must operate on the road accounting for the presence of vehicle 322, and vehicle 302 must operate according to traffic rules, which depend on road surface markings including road surface marking 324. Dynamic FOV unit 140 of may extract one or more perspective view features from camera images 320D, and transform these perspective view features into image data BEV features. The system may use these image data BEV features to generate an output for controlling vehicle 302.

Figure 4:
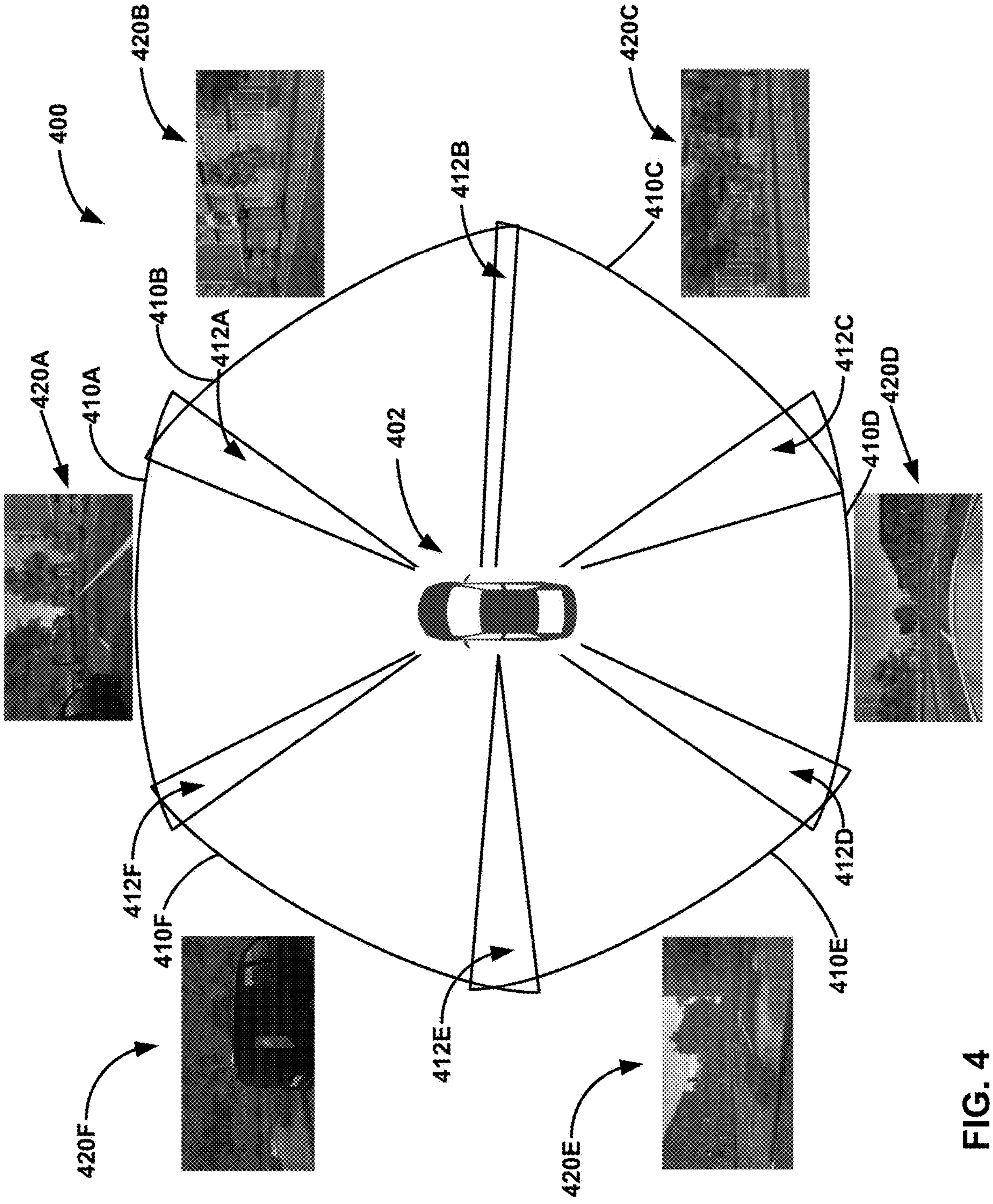
FIG. 4 is a conceptual diagram illustrating an environment including a vehicle as captured by one or more far-field cameras, in accordance with one or more techniques of this disclosure.

FIG. 4 is a conceptual diagram illustrating an environment 400 including a vehicle 402 as captured by one or more far-field cameras, in accordance with one or more techniques of this disclosure. As seen in FIG. 4, environment 400 may include vehicle 402, a set of FOVs 410A-410D (collectively, "FOVs 410"), a set of FOV overlap regions 412A-412D (collectively, "FOV overlap regions 412"), and a set of camera images 420A-420D (collectively, "camera images 420"). In some examples, each FOV of the set of FOVs may correspond to a camera of cameras 104 of FIG. 1. In some examples, each camera image of camera images 420 may correspond to an FOV of FOVs 410.

In some examples, environment 400 may be substantially the same as environment 300 of FIG. 3 except that the cameras associated with FOVs 410 are far-field cameras, whereas the cameras associated with FOVs 310 are near-field cameras. This means that FOVs 410 may be associated with smaller camera angles than FOVs 310, and cameras associated with FOVs 410 may capture information farther away from the cameras as compared with cameras associated with FOVs 310. Since FOVs 410 are narrower than FOVs 310, there may be six cameras associated with FOVs 410 whereas there are four cameras associated with FOVs 310.

Figure 5:
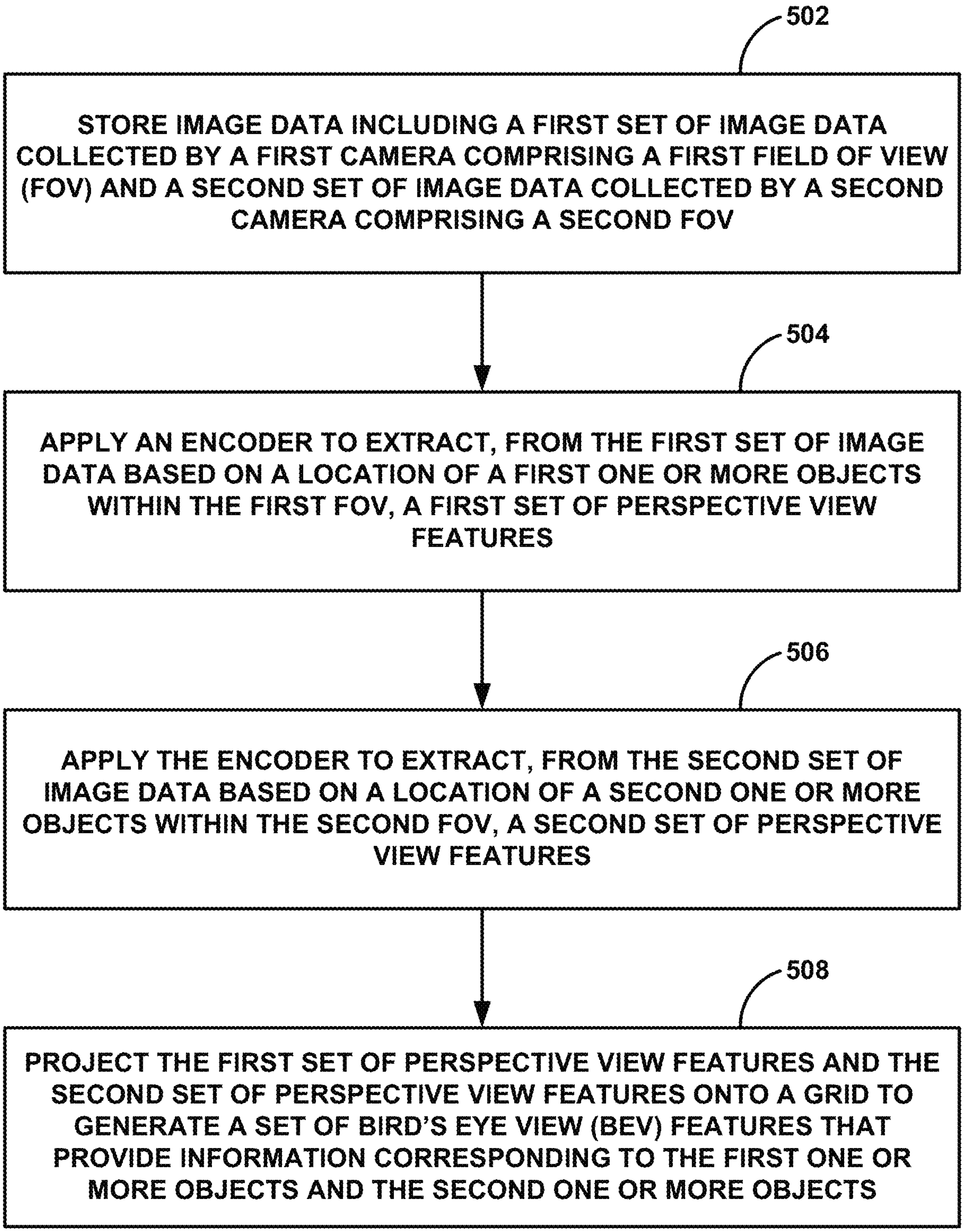
FIG. 5 is a flow diagram illustrating an example method for using stochastic dynamic field of view (FOV) layers to generate image data bird's eye view (BEV) features, in accordance with one or more techniques of this disclosure.

FIG. 5 is a flow diagram illustrating an example method for using stochastic dynamic FOV layers to generate image data BEV features, in accordance with one or more techniques of this disclosure. FIG. 5 is described with respect to processing system 100 and external processing system 180 of FIG. 1 and encoder-decoder architecture 200 of FIG. 2. However, the techniques of FIG. 5 may be performed by different components of processing system 100, external processing system 180, encoder-decoder architecture 200, or by additional or alternative systems.

Memory 160 may store image data including a first set of image data collected by a first camera comprising a first FOV and a second set of image data collected by a second camera comprising a second FOV (502). In some examples, the first set of image data may include a first one or more camera images of camera images 168 and the second set of image data may include a second one or more camera images of camera images 168. The first FOV may, in some cases, overlap with the second FOV. In some examples, the first set of image data may indicate one or more objects that are also indicated by the second set of image data. In some examples, the first set of image data may indicate one or more objects that are not indicated by the second set of image data. In some examples, the second set of image data may indicate one or more objects that are not indicated by the first set of image data.

Dynamic FOV unit 140 may apply an encoder to extract, from the first set of image data based on a location of a first one or more objects within the first FOV, a first set of perspective view features (504). Dynamic FOV unit 140 may apply the encoder to extract, from the second set of image data based on a location of a second one or more objects within the second FOV, a second set of perspective view features (506). In some examples, the encoder may include a set of stochastic dynamic FOV layers that process the first set of image data and the second set of image data to focus on one or more objects that are important for performing one or more tasks such as controlling a vehicle. Dynamic FOV unit 140 may project the first set of perspective view features and the second set of perspective view features onto a grid to generate a set of BEV features that provides information corresponding to the first one or more objects and the second one or more objects (508).

Additional aspects of the disclosure are detailed in numbered clauses below.

Clause 1—An apparatus for processing image data, the apparatus comprising: a memory for storing the image data, wherein the image data comprises a first set of image data collected by a first camera comprising a first FOV and a second set of image data collected by a second camera comprising a second FOV; and processing circuitry in communication with the memory. The processing circuitry is configured to: apply an encoder to extract, from the first set of image data based on a location of a first one or more objects within the first FOV, a first set of perspective view features; apply the encoder to extract, from the second set of image data based on a location of a second one or more objects within the second FOV, a second set of perspective view features; and project the first set of perspective view features and the second set of perspective view features onto a grid to generate a set of BEV features that provides information corresponding to the first one or more objects and the second one or more objects.

Clause 2—The apparatus of Clause 1, wherein to apply the encoder to extract the first set of perspective view features, the processing circuitry is configured to use a first stochastic depth scaling function to extract the first set of perspective view features based on a distance of each object of the first one or more objects from the first camera, and wherein to apply the encoder to extract the second set of perspective view features, the processing circuitry is configured to use a second stochastic depth scaling function to extract the second set of perspective view features based on a distance of each object of the second one or more objects from the second camera.

Clause 3—The apparatus of Clause 2, wherein the processing circuitry is further configured to: generate a first set of input perspective view features based on the first set of image data; generate a second set of input perspective view features based on the second set of image data; determine a first camera pose corresponding to the first camera; calculate, based on the first camera pose and the first FOV, a first FOV mask corresponding to the first camera; determine a second camera pose corresponding to the second camera; calculate, based on the second camera pose and the second FOV, a second FOV mask corresponding to the second camera; extract the first set of perspective view features based on the first set of input perspective view features, the first stochastic depth scaling function, and the first FOV mask; and extract the second set of perspective view features based on the second set of input perspective view features, the second stochastic depth scaling function, and the second FOV mask.

Clause 4—The apparatus of Clause 3, wherein to extract the first set of perspective view features, the processing circuitry is configured to multiply, for each spatial location of a set of spatial locations, the first set of input perspective view features, the first stochastic depth scaling function, and the first FOV mask, and wherein to extract the second set of perspective view features, the processing circuitry is configured to multiply, for each spatial location of a set of spatial locations, the second set of input perspective view features, the second stochastic depth scaling function, and the second FOV mask.

Clause 5—The apparatus of any of Clauses 1-4, wherein the image data further comprises a third set of image data collected by a third camera comprising a third FOV and a fourth set of image data collected by a fourth camera comprising a fourth FOV, and wherein the processing circuitry is further configured to: apply the encoder to extract, from the third set of image data based on a location of a third one or more objects within the third FOV, a third set of perspective view features; apply the encoder to extract, from the fourth set of image data based on a location of a fourth one or more objects within the fourth FOV, a fourth set of perspective view features; and project the third set of perspective view features and the fourth set of perspective view features onto the grid to generate the set of BEV features.

Clause 6—The apparatus of any of Clauses 1-5, wherein the first FOV overlaps with the second FOV, and wherein to apply the encoder to extract the first set of perspective view features and extract the second set of perspective view features, the processing circuitry is configured to capture information in the first set of perspective view features and the second set of perspective view features corresponding to one or more objects of the first one or more objects and the second one or more objects located within both of the first FOV and the second FOV.

Clause 7—The apparatus of any of Clauses 1-6, wherein to project the first set of perspective view features and the second set of perspective view features onto the grid to generate the set of BEV features, the processing circuitry is configured to: perform one or more stochastic drop actions to drop one or more features of the first set of perspective view features and the second set of perspective view features; and transform, using a least squares operation, the first set of perspective view features and the second set of perspective view features into the set of BEV features.

Clause 8—The apparatus of any of Clauses 1-7, wherein the memory is further configured to store a set of training data comprising a plurality of sets of training image data, and wherein the processing circuitry is further configured to train, based on the plurality of sets of training image data, the encoder, wherein the encoder represents a residual network comprising a set of layers.

Clause 9—The apparatus of Clause 8, wherein to train the encoder, the processing circuitry is configured to: perform a plurality of training iterations using the plurality of sets of training image data, wherein during each training iteration of the plurality of training iterations, the processing circuitry is configured to cause the residual network to skip one or more layers of the set of layers; and insert the skipped layers of the set of layers into the residual network to complete training of the encoder.

Clause 10—The apparatus of Clause 9, wherein to cause the residual network to skip one or more layers of the set of layers, the processing circuitry is configured to determine whether to skip each layer of the set of layers according to a probability of skipping the layer, wherein the probability of skipping the layer is smaller when the layer corresponds to one or more objects and the probability of skipping the layer is greater when the layer corresponds to a background region.

Clause 11—The apparatus of any of Clauses 1-10, wherein the processing circuitry is further configured to apply a decoder to generate an output based on the set of BEV features.

Clause 12—The apparatus of Clause 11, wherein the processing circuitry is further configured to use the output generated by the decoder to control a device based on the first one or more objects and the second one or more objects.

Clause 13—The apparatus of Clause 12, wherein the device is a vehicle, wherein to apply the decoder to generate the output based on the set of BEV features, the processing circuitry is configured to cause the decoder to generate the output to include information identifying one or more characteristics corresponding to each object of the first one or more objects and the second one or more objects, and wherein to use the output generated by the decoder to control the vehicle based on the first one or more objects and the second one or more objects, the processing circuitry is configured to use the output generated by the decoder to control the vehicle based on the one or more characteristics corresponding to each object of the first one or more objects and the second one or more objects.

Clause 14—The apparatus of Clause 13, wherein the one or more characteristics corresponding to each object of the first one or more objects and the second one or more objects may include an identity of the object, a location of the object relative to the vehicle, one or more characteristics of a movement of the object, one or more actions performed by the object, or any combination thereof.

Clause 15—The apparatus of any of Clauses 1-14, wherein the processing circuitry is part of an ADAS.

Clause 16—A method comprising: storing image data in a memory, wherein the image data comprises a first set of image data collected by a first camera comprising a first FOV and a second set of image data collected by a second camera comprising a second FOV; applying an encoder to extract, from the first set of image data based on a location of a first one or more objects within the first FOV, a first set of perspective view features; applying the encoder to extract, from the second set of image data based on a location of a second one or more objects within the second FOV, a second set of perspective view features; and projecting the first set of perspective view features and the second set of perspective view features onto a grid to generate a set of BEV features that provides information corresponding to the first one or more objects and the second one or more objects.

Clause 17—The method of clause 16, wherein applying the encoder to extract the first set of perspective view features comprises using a first stochastic depth scaling function to extract the first set of perspective view features based on a distance of each object of the first one or more objects from the first camera, and wherein applying the encoder to extract the second set of perspective view features comprises using a second stochastic depth scaling function to extract the second set of perspective view features based on a distance of each object of the second one or more objects from the second camera.

Clause 18—The method of clause 17, further comprising: generating a first set of input perspective view features based on the first set of image data; generating a second set of input perspective view features based on the second set of image data; determining a first camera pose corresponding to the first camera; calculating, based on the first camera pose and the first FOV, a first FOV mask corresponding to the first camera; determining a second camera pose corresponding to the second camera; calculating, based on the second camera pose and the second FOV, a second FOV mask corresponding to the second camera; extracting the first set of perspective view features based on the first set of input perspective view features, the first stochastic depth scaling function, and the first FOV mask; and extracting the second set of perspective view features based on the second set of input perspective view features, the second stochastic depth scaling function, and the second FOV mask.

Clause 19—The method of clause 18, wherein extracting the first set of perspective view features comprises multiplying, for each spatial location of a set of spatial locations, the first set of input perspective view features, the first stochastic depth scaling function, and the first FOV mask, and wherein extracting the second set of perspective view features comprises multiplying, for each spatial location of a set of spatial locations, the second set of input perspective view features, the second stochastic depth scaling function, and the second FOV mask.

Clause 20—The method of any of Clauses 16-19, wherein the image data further comprises a third set of image data collected by a third camera comprising a third FOV and a fourth set of image data collected by a fourth camera comprising a fourth FOV, and wherein the method further comprises: applying the encoder to extract, from the third set of image data based on a location of a third one or more objects within the third FOV, a third set of perspective view features; applying the encoder to extract, from the fourth set of image data based on a location of a fourth one or more objects within the fourth FOV, a fourth set of perspective view features; and projecting the third set of perspective view features and the fourth set of perspective view features onto the grid to generate the set of BEV features.

Clause 21—The method of any of Clauses 16-20, wherein the first FOV overlaps with the second FOV, and wherein applying the encoder to extract the first set of perspective view features and extract the second set of perspective view features comprises capturing information in the first set of perspective view features and the second set of perspective view features corresponding to one or more objects of the first one or more objects and the second one or more objects located within both of the first FOV and the second FOV.

Clause 22—The method of any of Clauses 16-21, wherein projecting the first set of perspective view features and the second set of perspective view features onto the grid to generate the set of BEV features comprises: performing one or more stochastic drop actions to drop one or more features of the first set of perspective view features and the second set of perspective view features; and transforming, using a least squares operation, the first set of perspective view features and the second set of perspective view features into the set of BEV features.

Clause 23—The method of any of Clauses 16-22, further comprising: storing a set of training data comprising a plurality of sets of training image data; and training, based on the plurality of sets of training image data, the encoder, wherein the encoder represents a residual network comprising a set of layers.

Clause 24—The method of clause 23, wherein training the encoder comprises: performing a plurality of training iterations using the plurality of sets of training image data, wherein during each training iteration of the plurality of training iterations, the method comprises causing the residual network to skip one or more layers of the set of layers; and inserting the skipped layers of the set of layers into the residual network to complete training of the encoder.

Clause 25—The method of clause 24, wherein causing the residual network to skip one or more layers of the set of layers comprises determining whether to skip each layer of the set of layers according to a probability of skipping the layer, wherein the probability of skipping the layer is smaller when the layer corresponds to one or more objects and the probability of skipping the layer is greater when the layer corresponds to a background region.

Clause 26—The method of any of Clauses 16-25, further comprising applying a decoder to generate an output based on the set of BEV features.

Clause 27—The method of clause 26, further comprising using the output generated by the decoder to control a device based on the first one or more objects and the second one or more objects.

Clause 28—The method of clause 26, wherein the device is a vehicle, wherein applying the decoder to generate the output based on the set of BEV features comprises causing the decoder to generate the output to include information identifying one or more characteristics corresponding to each object of the first one or more objects and the second one or more objects, and wherein using the output generated by the decoder to control the vehicle based on the first one or more objects and the second one or more objects comprises using the output generated by the decoder to control the vehicle based on the one or more characteristics corresponding to each object of the first one or more objects and the second one or more objects.

Clause 29—A computer-readable medium storing instructions that, when applied by processing circuitry, causes the processing circuitry to: store image data in a memory, wherein the image data comprises a first set of image data collected by a first camera comprising a first FOV and a second set of image data collected by a second camera comprising a second FOV; apply an encoder to extract, from the first set of image data based on a location of a first one or more objects within the first FOV, a first set of perspective view features; apply the encoder to extract, from the second set of image data based on a location of a second one or more objects within the second FOV, a second set of perspective view features; and project the first set of perspective view features and the second set of perspective view features onto a grid to generate a set of BEV features that provides information corresponding to the first one or more objects and the second one or more objects.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and applied by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be applied by one or more processors, such as one or more DSPs, general purpose microprocessors, ASICs, FPGAs, or other equivalent integrated or discrete logic circuitry. Accordingly, the terms “processor” and “processing circuitry,” as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus for processing image data, the apparatus comprising:

a memory for storing the image data, wherein the image data comprises a first set of image data collected by a first camera comprising a first field of view (FOV) and a second set of image data collected by a second camera comprising a second FOV; and processing circuitry in communication with the memory, wherein the processing circuitry is configured to:

apply an encoder to extract, from the first set of image data based on a location of a first one or more objects within the first FOV, a first set of perspective view features, wherein the encoder comprises a plurality of network layers configured to extract features from received image data, and wherein to apply the encoder to extract the first set of perspective view features, the processing circuitry is configured to:

determine first distances to each object of the first one or more objects from the first camera;

apply the first distances to a first stochastic depth scaling function to determine a first set of dropped network layers to be dropped from the plurality of network layers to form a first remaining set of network layers that excludes the first set of dropped network layers; and apply the first remaining set of network layers to the first set of image data to extract the first set of perspective view features;

apply the encoder to extract, from the second set of image data based on a location of a second one or more objects within the second FOV, a second set of perspective view features, wherein to apply the encoder to extract the second set of perspective view features, the processing circuitry is configured to:

determine second distances to each object of the second one or more objects from the second camera;

apply the second distances to a second stochastic depth scaling function to determine a second set of dropped network layers from the plurality of network layers to form a second remaining set of network layers that excludes the second set of dropped network layers, the first set of dropped network layers being different than the second set of dropped network layers; and apply the second remaining set of network layers to the second set of image data to extract the second set of perspective view features; and project the first set of perspective view features and the second set of perspective view features onto a grid to generate a set of bird's eye view (BEV) features that provides information corresponding to the first one or more objects and the second one or more objects.

2. The apparatus of claim 1, wherein the processing circuitry is further configured to:

determine a first camera pose corresponding to the first camera;

calculate, based on the first camera pose and the first FOV, a first FOV mask corresponding to the first camera;

determine a second camera pose corresponding to the second camera;

calculate, based on the second camera pose and the second FOV, a second FOV mask corresponding to the second camera;

extract the first set of perspective view features based on first FOV mask; and extract the second set of perspective view features based on the second FOV mask.

3. The apparatus of claim 2, wherein to extract the first set of perspective view features, the processing circuitry is configured to multiply, for each spatial location of a set of spatial locations, a first set of input perspective view features extracted by the first set of remaining network layers, the first stochastic depth scaling function, and the first FOV mask, and wherein to extract the second set of perspective view features, the processing circuitry is configured to multiply, for each spatial location of a set of spatial locations, a second set of input perspective view features extracted by the second set of remaining network layers, the second stochastic depth scaling function, and the second FOV mask.

4. The apparatus of claim 1, wherein the image data further comprises a third set of image data collected by a third camera comprising a third FOV and a fourth set of image data collected by a fourth camera comprising a fourth FOV, and wherein the processing circuitry is further configured to:

apply the encoder to extract, from the third set of image data based on a location of a third one or more objects within the third FOV, a third set of perspective view features;

apply the encoder to extract, from the fourth set of image data based on a location of a fourth one or more objects within the fourth FOV, a fourth set of perspective view features; and project the third set of perspective view features and the fourth set of perspective view features onto the grid to generate the set of BEV features.

5. The apparatus of claim 1, wherein the first FOV overlaps with the second FOV, and wherein to apply the encoder to extract the first set of perspective view features and extract the second set of perspective view features, the processing circuitry is configured to capture information in the first set of perspective view features and the second set of perspective view features corresponding to one or more objects of the first one or more objects and the second one or more objects located within both of the first FOV and the second FOV.

6. The apparatus of claim 1, wherein to project the first set of perspective view features and the second set of perspective view features onto the grid to generate the set of BEV features, the processing circuitry is configured to:

perform one or more stochastic drop actions to drop one or more features of the first set of perspective view features and the second set of perspective view features; and transform, using a least squares operation, the first set of perspective view features and the second set of perspective view features into the set of BEV features.

7. The apparatus of claim 1, wherein the memory is further configured to store a set of training data comprising a plurality of sets of training image data, and wherein the processing circuitry is further configured to train, based on the plurality of sets of training image data, the encoder, wherein the encoder represents a residual network comprising a set of layers.

8. The apparatus of claim 7, wherein to train the encoder, the processing circuitry is configured to:

perform a plurality of training iterations using the plurality of sets of training image data, wherein during each training iteration of the plurality of training iterations, the processing circuitry is configured to cause the residual network to skip one or more layers of the set of layers; and insert the skipped layers of the set of layers into the residual network to complete training of the encoder.

9. The apparatus of claim 8, wherein to cause the residual network to skip one or more layers of the set of layers, the processing circuitry is configured to determine whether to skip each layer of the set of layers according to a probability of skipping the layer, wherein the probability of skipping the layer is smaller when the layer corresponds to one or more objects and the probability of skipping the layer is greater when the layer corresponds to a background region.

10. The apparatus of claim 1, wherein the processing circuitry is further configured to apply a decoder to generate an output based on the set of BEV features.

11. The apparatus of claim 10, wherein the processing circuitry is further configured to use the output generated by the decoder to control a device based on the first one or more objects and the second one or more objects.

12. The apparatus of claim 11, wherein the device is a vehicle, wherein to apply the decoder to generate the output based on the set of BEV features, the processing circuitry is configured to cause the decoder to generate the output to include information identifying one or more characteristics corresponding to each object of the first one or more objects and the second one or more objects, and wherein to use the output generated by the decoder to control the vehicle based on the first one or more objects and the second one or more objects, the processing circuitry is configured to use the output generated by the decoder to control the vehicle based on the one or more characteristics corresponding to each object of the first one or more objects and the second one or more objects.

13. The apparatus of claim 12, wherein the one or more characteristics corresponding to each object of the first one or more objects and the second one or more objects may include an identity of the object, a location of the object relative to the vehicle, one or more characteristics of a movement of the object, one or more actions performed by the object, or any combination thereof.

14. The apparatus of claim 1, wherein the processing circuitry is part of an advanced driver assistance system (ADAS).

15. A method comprising:

storing image data in a memory, wherein the image data comprises a first set of image data collected by a first camera comprising a first field of view (FOV) and a second set of image data collected by a second camera comprising a second FOV;

applying an encoder to extract, from the first set of image data based on a location of a first one or more objects within the first FOV, a first set of perspective view features, wherein the encoder comprises a plurality of network layers configured to extract features from received image data, and wherein applying the encoder to extract the first set of perspective view features comprises:

determining first distances to each object of the first one or more objects from the first camera;

applying the first distances to a first stochastic depth scaling function to determine a first set of dropped network layers to be dropped from the plurality of network layers to form a first remaining set of network layers that excludes the first set of dropped network layers; and applying the first remaining set of network layers to the first set of image data to extract the first set of perspective view features;

applying the encoder to extract, from the second set of image data based on a location of a second one or more objects within the second FOV, a second set of perspective view features, wherein applying the encoder to extract the second set of perspective view features comprises:

determining second distances to each object of the second one or more objects from the second camera;

applying the second distances to a second stochastic depth scaling function to determine a second set of dropped network layers to be dropped from the plurality of network layers to form a second remaining set of network layers that excludes the second set of dropped network layers, the first set of dropped network layers being different than the second set of dropped network layers; and applying the second remaining set of network layers to the second set of image data to extract the second set of perspective view features; and projecting the first set of perspective view features and the second set of perspective view features onto a grid to generate a set of bird's eye view (BEV) features that provides information corresponding to the first one or more objects and the second one or more objects.

16. The method of claim 15, further comprising:

determining a first camera pose corresponding to the first camera;

calculating, based on the first camera pose and the first FOV, a first FOV mask corresponding to the first camera;

determining a second camera pose corresponding to the second camera;

calculating, based on the second camera pose and the second FOV, a second FOV mask corresponding to the second camera;

extracting the first set of perspective view features based on the first FOV mask; and extracting the second set of perspective view features based on the second FOV mask.

17. The method of claim 16, wherein extracting the first set of perspective view features comprises multiplying, for each spatial location of a set of spatial locations, a first set of input perspective view features extracted by the first set of remaining network layers, the first stochastic depth scaling function, and the first FOV mask, and wherein extracting the second set of perspective view features comprises multiplying, for each spatial location of a set of spatial locations, a second set of input perspective view features extracted by the second set of remaining network layers, the second stochastic depth scaling function, and the second FOV mask.

18. The method of claim 15, wherein the image data further comprises a third set of image data collected by a third camera comprising a third FOV and a fourth set of image data collected by a fourth camera comprising a fourth FOV, and wherein the method further comprises:

applying the encoder to extract, from the third set of image data based on a location of a third one or more objects within the third FOV, a third set of perspective view features;

applying the encoder to extract, from the fourth set of image data based on a location of a fourth one or more objects within the fourth FOV, a fourth set of perspective view features; and projecting the third set of perspective view features and the fourth set of perspective view features onto the grid to generate the set of BEV features.

19. The method of claim 15, wherein the first FOV overlaps with the second FOV, and wherein applying the encoder to extract the first set of perspective view features and extract the second set of perspective view features comprises capturing information in the first set of perspective view features and the second set of perspective view features corresponding to one or more objects of the first one or more objects and the second one or more objects located within both of the first FOV and the second FOV.

20. The method of claim 15, wherein projecting the first set of perspective view features and the second set of perspective view features onto the grid to generate the set of BEV features comprises:

performing one or more stochastic drop actions to drop one or more features of the first set of perspective view features and the second set of perspective view features; and transforming, using a least squares operation, the first set of perspective view features and the second set of perspective view features into the set of BEV features.

21. The method of claim 15, further comprising:

storing a set of training data comprising a plurality of sets of training image data; and training, based on the plurality of sets of training image data, the encoder, wherein the encoder represents a residual network comprising a set of layers.

22. The method of claim 21, wherein training the encoder comprises:

performing a plurality of training iterations using the plurality of sets of training image data, wherein during each training iteration of the plurality of training iterations, the method comprises causing the residual network to skip one or more layers of the set of layers; and inserting the skipped layers of the set of layers into the residual network to complete training of the encoder.

23. The method of claim 22, wherein causing the residual network to skip one or more layers of the set of layers comprises determining whether to skip each layer of the set of layers according to a probability of skipping the layer, wherein the probability of skipping the layer is smaller when the layer corresponds to one or more objects and the probability of skipping the layer is greater when the layer corresponds to a background region.

24. The method of claim 15, further comprising applying a decoder to generate an output based on the set of BEV features.

25. The method of claim 24, further comprising using the output generated by the decoder to control a device based on the first one or more objects and the second one or more objects.

26. The method of claim 25, wherein the device is a vehicle, wherein applying the decoder to generate the output based on the set of BEV features comprises causing the decoder to generate the output to include information identifying one or more characteristics corresponding to each object of the first one or more objects and the second one or more objects, and wherein using the output generated by the decoder to control the vehicle based on the first one or more objects and the second one or more objects comprises using the output generated by the decoder to control the vehicle based on the one or more characteristics corresponding to each object of the first one or more objects and the second one or more objects.

27. A non-transitory computer-readable medium having stored thereon instructions that, when executed by processing circuitry, cause the processing circuitry to:

store image data in a memory, wherein the image data comprises a first set of image data collected by a first camera comprising a first field of view (FOV) and a second set of image data collected by a second camera comprising a second FOV;

apply an encoder to extract, from the first set of image data based on a location of a first one or more objects within the first FOV, a first set of perspective view features, wherein the encoder comprises a plurality of network layers configured to extract features from received image data, and wherein the instructions that cause the processing circuitry to apply the encoder to extract the first set of perspective view features comprise instructions that cause the processing circuitry to:

determine first distances to each object of the first one or more objects from the first camera;

apply the first distances to a first stochastic depth scaling function to determine a first set of dropped network layers to be dropped from the plurality of network layers to form a first remaining set of network layers that excludes the first set of dropped network layers; and apply the first remaining set of network layers to the first set of image data to extract the first set of perspective view features;

apply the encoder to extract, from the second set of image data based on a location of a second one or more objects within the second FOV, a second set of perspective view features, wherein the instructions that cause the processing circuitry to apply the encoder to extract the second set of perspective view features comprise instructions that cause the processing circuitry to:

determine second distances to each object of the second one or more objects from the second camera;

apply the second distances to a second stochastic depth scaling function to determine a second set of dropped network layers from the plurality of network layers to form a second remaining set of network layers that excludes the second set of dropped network layers, the first set of dropped network layers being different than the second set of dropped network layers; and apply the second remaining set of network layers to the second set of image data to extract the second set of perspective view features; and project the first set of perspective view features and the second set of perspective view features onto a grid to generate a set of bird's eye view (BEV) features that provides information corresponding to the first one or more objects and the second one or more objects.

28. The apparatus of claim 1, wherein the processing circuitry is further configured to dynamically adjust a size and a location of the grid based on sizes and locations of the first one or more objects and the second one or more objects, wherein to dynamically adjust the size and the location of the grid, the processing circuitry is configured to:

determine one or more regions of high object density based on the first set of perspective view features and the second set of perspective view features;

determine a set of anchor points in a bird's eye view (BEV) space based on the one or more regions of high object density; and set the size and the location of the grid such that corners of the grid are placed at corresponding anchor points of the set of anchor points.

29. The method of claim 15, further comprising dynamically adjusting a size and a location of the grid based on sizes and locations of the first one or more objects and the second one or more objects, including:

determining one or more regions of high object density based on the first set of perspective view features and the second set of perspective view features;

determining a set of anchor points in a bird's eye view (BEV) space based on the one or more regions of high object density; and setting the size and the location of the grid such that corners of the grid are placed at corresponding anchor points of the set of anchor points.

* * * * *